(12) United States Patent
Ozawa et al.

(10) Patent No.: US 10,003,707 B2
(45) Date of Patent: Jun. 19, 2018

(54) IMAGE PROCESSING APPARATUS AND RECORDING MEDIUM

(71) Applicant: Konica Minolta, Inc., Chiyoda-ku (JP)

(72) Inventors: Kaitaku Ozawa, Nishinomiya (JP); Katsuhiko Akita, Amagasaki (JP); Yuji Okamoto, Nishinomiya (JP); Masami Yamada, Osaka (JP); Yuki Asai, Itami (JP); Kenichi Takahashi, Osaka (JP); Yasutaka Ito, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/462,034

(22) Filed: Mar. 17, 2017

(65) Prior Publication Data
US 2017/0279997 A1    Sep. 28, 2017

(30) Foreign Application Priority Data

Mar. 22, 2016  (JP) ................................. 2016-056448

(51) Int. Cl.
*H04N 1/00* (2006.01)

(52) U.S. Cl.
CPC ....... *H04N 1/00925* (2013.01); *H04N 1/0023* (2013.01); *H04N 1/0044* (2013.01); *H04N 1/00477* (2013.01); *H04N 1/00506* (2013.01); *H04N 2201/0094* (2013.01)

(58) Field of Classification Search
CPC .............................. G06F 21/608; G06F 3/1238
See application file for complete search history.

(56) References Cited

U.S. PATENT DOCUMENTS

| | | | | |
|---|---|---|---|---|
| 2007/0133033 | A1* | 6/2007 | Mizutani | G06F 21/608 358/1.14 |
| 2013/0114103 | A1* | 5/2013 | Oishi | G06F 3/1204 358/1.15 |

FOREIGN PATENT DOCUMENTS

| | | | | |
|---|---|---|---|---|
| JP | 2007-288330 | * | 11/2007 | ............... H04N 1/00 |
| JP | 2007-288330 | A | 11/2007 | |

* cited by examiner

*Primary Examiner* — Ibrahim Siddo
(74) *Attorney, Agent, or Firm* — Buchanan Ingersoll & Rooney PC

(57) ABSTRACT

An image processing apparatus includes a display unit that displays a preview image of a document on a preview screen during login of a first user, a communication controller that receives a job from an external device, a determination unit that determines whether the job received from the external device is a specific type of job, and a display controller that controls display on the preview screen. When the specific type of job is received during display of the preview screen, the display controller assumes a predetermined degree or more of possibility that a second user different from the first user may approach the apparatus, and performs at least one of first display control where the preview image is automatically hidden on the preview screen and second display control where a non-display button for hiding the preview image according to a user operation is displayed on the preview screen.

29 Claims, 20 Drawing Sheets

Fig.9

<USER U2>

| No. | JOB RECEIPT TIME (YYYY.MM.DD HH:MM:SS) | RECEIVING-OBJECT RECEIPT TIME (YYYY.MM.DD HH:MM:SS) | RECEIVING DURATION |
|---|---|---|---|
| 1 | 2016.01.10 10:00:00 | 2016.01.10 10:00:10 | 10 SECONDS |
| 2 | 2016.01.10 11:30:20 | 2016.01.10 11:30:35 | 15 SECONDS |
| 3 | 2016.01.11 15:20:05 | 2016.01.11 15:20:10 | 5 SECONDS |

•
•
•

| AVERAGE RECEIVING DURATION Ta | 10 SECONDS |
|---|---|
| EXPECTED APPROACH DURATION Tb | 8 SECONDS |

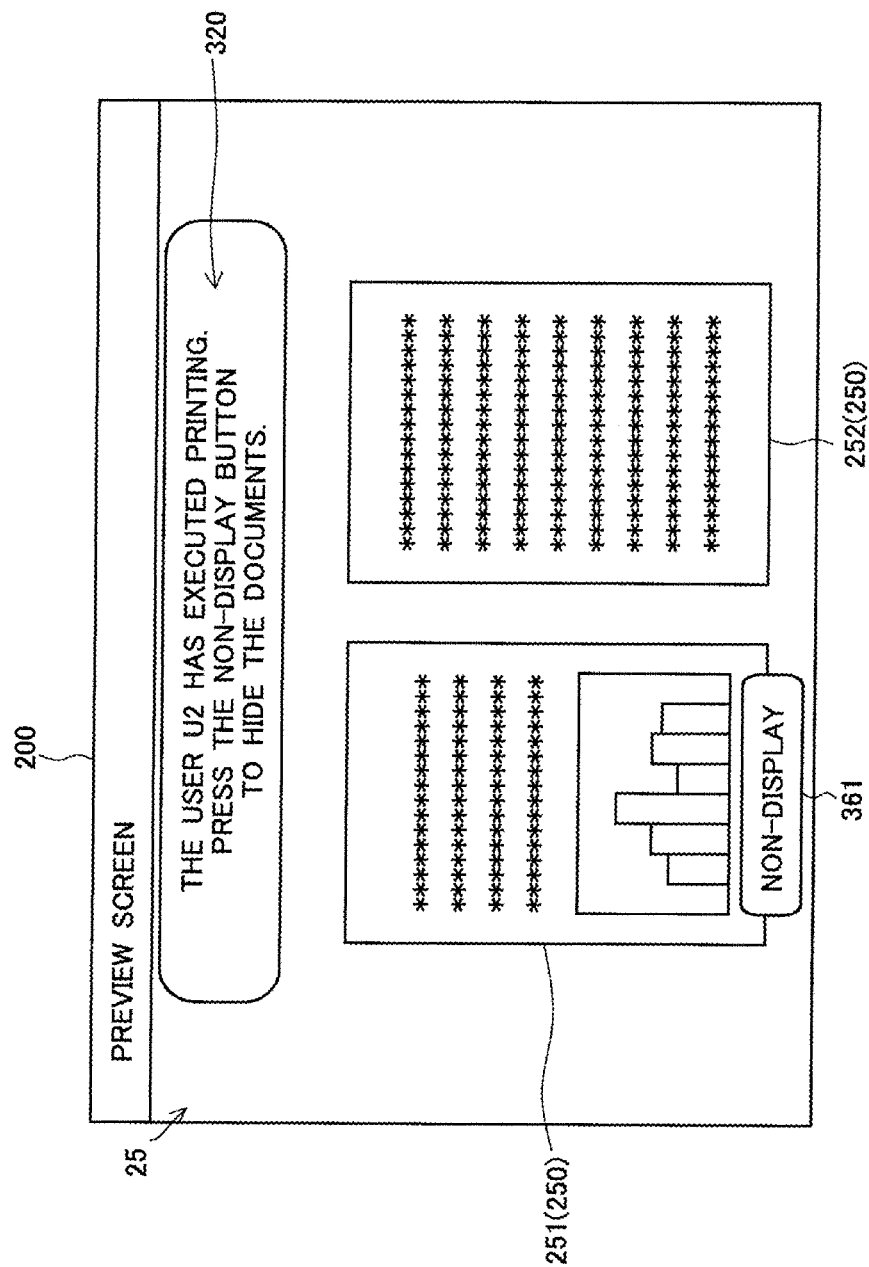

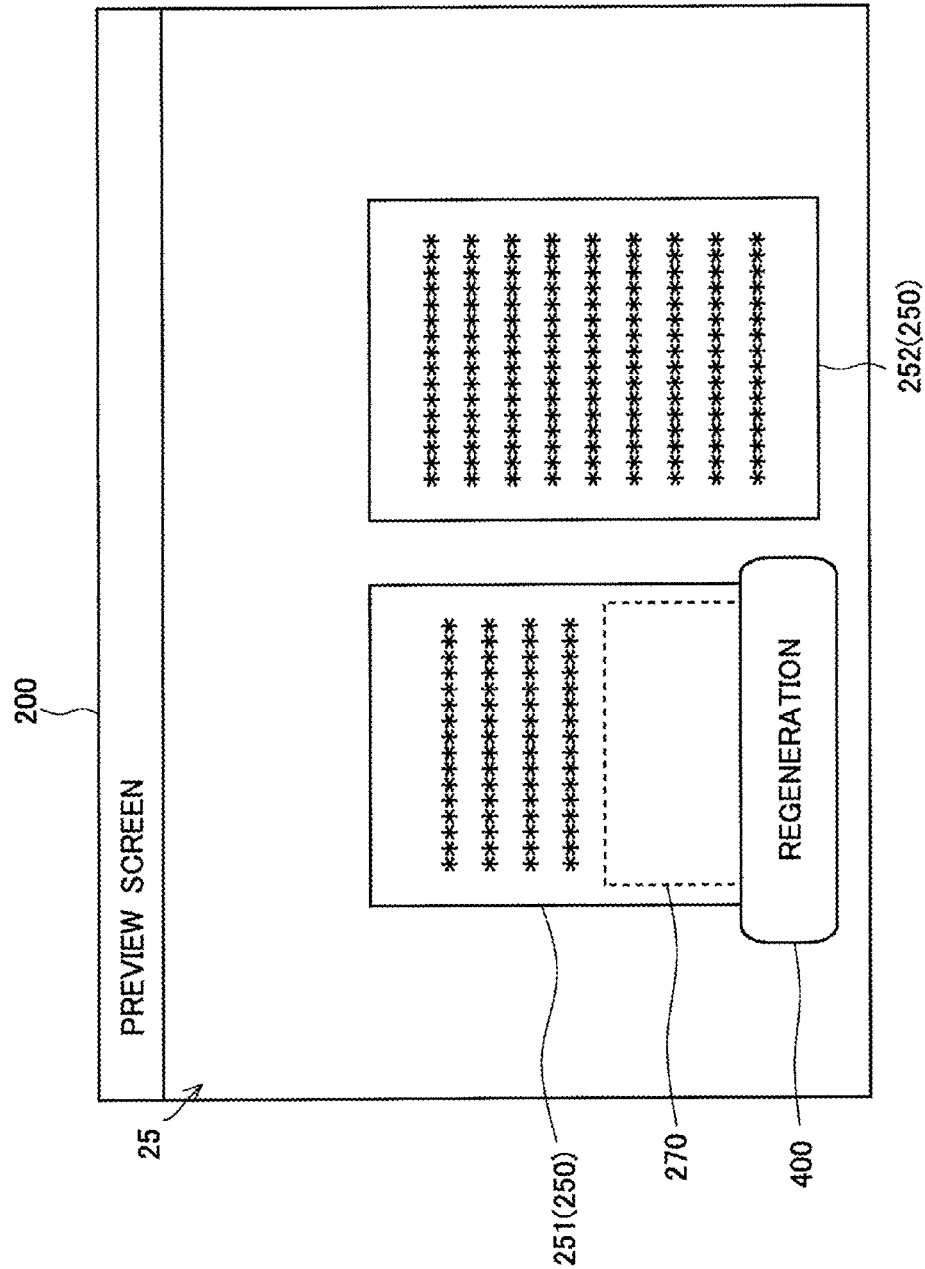

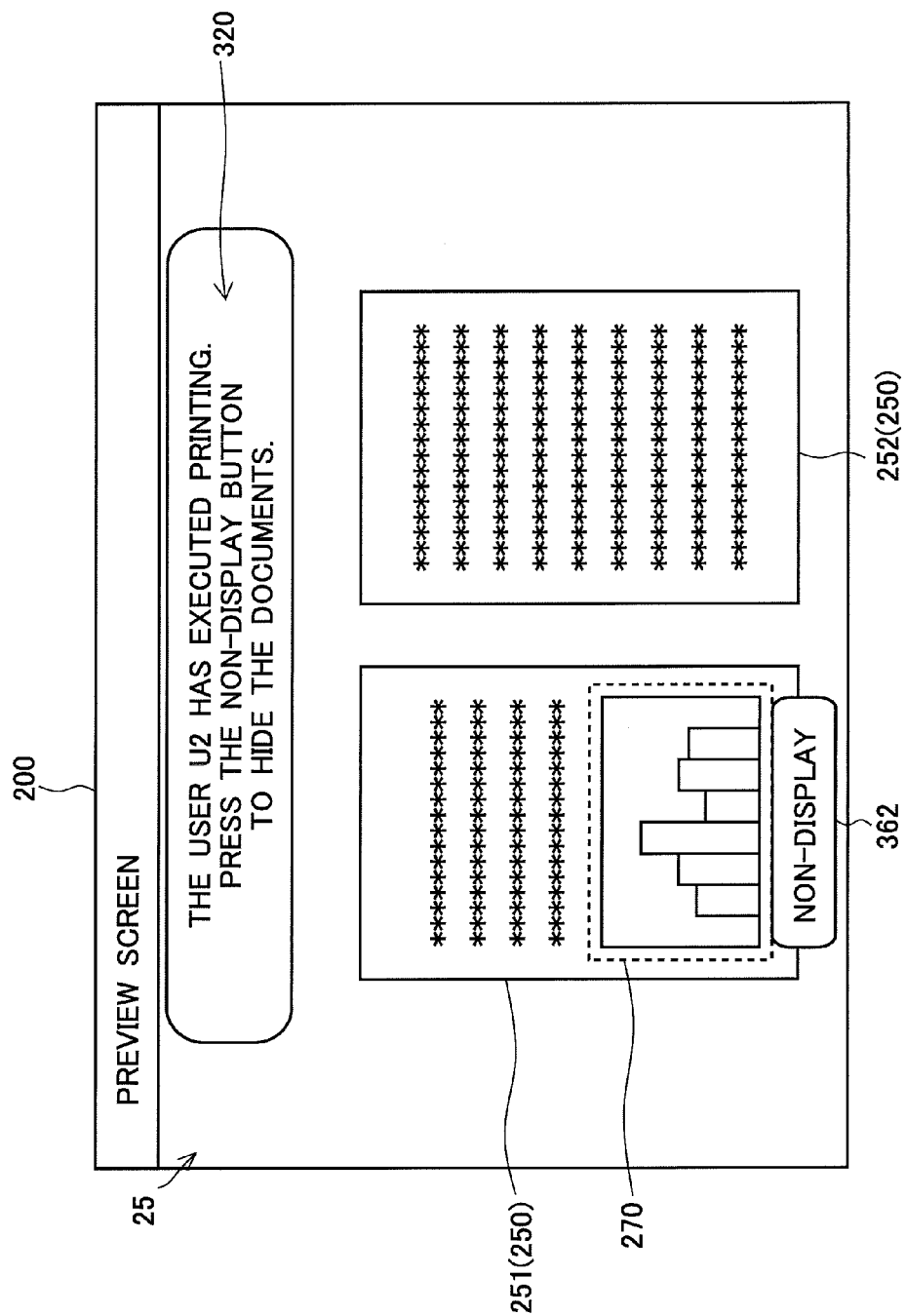

IMAGE PROCESSING APPARATUS AND RECORDING MEDIUM

The present U.S. patent application claims a priority under the Paris Convention of Japanese patent application No. 2016-056448 filed on Mar. 22, 2016, the entirety of which is incorporated herein by references.

BACKGROUND OF INVENTION

Technical Field

The present invention relates to an image processing apparatus such as a Multi-Functional Peripheral (MFP) and a technique related thereto.

Background Art

There are techniques for controlling display on a preview screen of an image processing apparatus so as to prevent other users from peeking at documents displayed on the preview screen.

For example, Japanese Patent Application Laid-Open No. 2007-288330 discloses a technique for detecting the presence or absence of moving objects around an image processing apparatus with a sensor, and if the sensor has detected the presence of a third party other than the operator of the image processing apparatus, performing processing such as hiding documents displayed on the preview screen.

However, the following problem is conceivable in the case of using a sensor to prevent other users from peeking at the screen.

More specifically, when a sensor is used to prevent other users from peeking at the screen and if another user has entered the detectable range of the sensor, documents displayed on the preview screen are hidden, irrespective of whether or not the user detected by the sensor is approaching the image processing apparatus (i.e., without variation). Thus, even a mere passing by of a user who has no intention to approach the image processing apparatus within the detectable range of the sensor will result in hiding of the documents displayed on the preview screen This consequently reduces the operating efficiency of a user who is browsing the documents.

SUMMARY OF INVENTION

It is an object of the present invention to provide a technique that suppresses the occurrence of another user peeking at documents displayed on a preview screen of an image processing apparatus while taking into consideration the possibility that the other user may approach the image processing apparatus.

According to a first aspect of the present invention, the image processing apparatus includes a display unit configured to display a preview image of a document on a preview screen while a first user is logged in to the image processing apparatus, a communication controller configured to receive a job from an external device, a determination unit configured to determine whether the job received from the external device is a specific type of job, and a display controller configured to control display on the preview screen. The display controller is configured to, when it is determined that the specific type of job has been received during display of the preview screen, assume that there is a predetermined degree or more of possibility that a second user different from the first user will approach the image processing apparatus, and perform at least one of first display control and second display control, the first display control being control in which the preview image is automatically hidden on the preview image, and the second display control being control in which a non-display button for hiding the preview image in accordance with a user operation is displayed on the preview screen.

According to a second aspect of the present invention, a non-transitory computer-readable recording medium that stores a program for causing a computer built into an image processing apparatus to execute a) displaying a preview image of a document on a preview screen while a first user is logged in to the image processing apparatus, b) receiving a job from an external device, c) determining whether the job received from the external device is a specific type of job, and d) controlling display on the preview screen. In the operation d), when it is determined that the specific type of job has been received during display of the preview screen, it is assumed that there is a predetermined degree or more of possibility that a second user different from the first user will approach the image processing apparatus, and at least one of first display control and second display control is performed, the first display control being control in which the preview image is automatically hidden on the preview image, and the second display control being control in which a non-display button for hiding the preview image in accordance with a user operation is displayed on the preview screen.

These and other objects, features, aspects and advantages of the present invention will become more apparent from the following detailed description of the present invention when taken in conjunction with the accompanying drawings.

BRIEF DESCRIPTION OF DRAWINGS

FIG. 9 is a diagram for explaining, for example, calculation of an expected approach duration.

FIG. 18 illustrates a preview screen (before the documents are hidden) according to the second variation of the fourth embodiment.

FIG. 19 illustrates a preview screen (after the documents are hidden) according to a variation.

FIG. 20 illustrates a preview screen (before the documents are hidden) according to the variation.

DETAILED DESCRIPTION OF PREFERRED EMBODIMENTS

Hereinafter, an embodiment of the present invention will be described with reference to the drawings. However, the scope of the invention is not limited to the illustrated examples.

1. First Embodiment 1-1. Overview of Configuration

Figure 1:
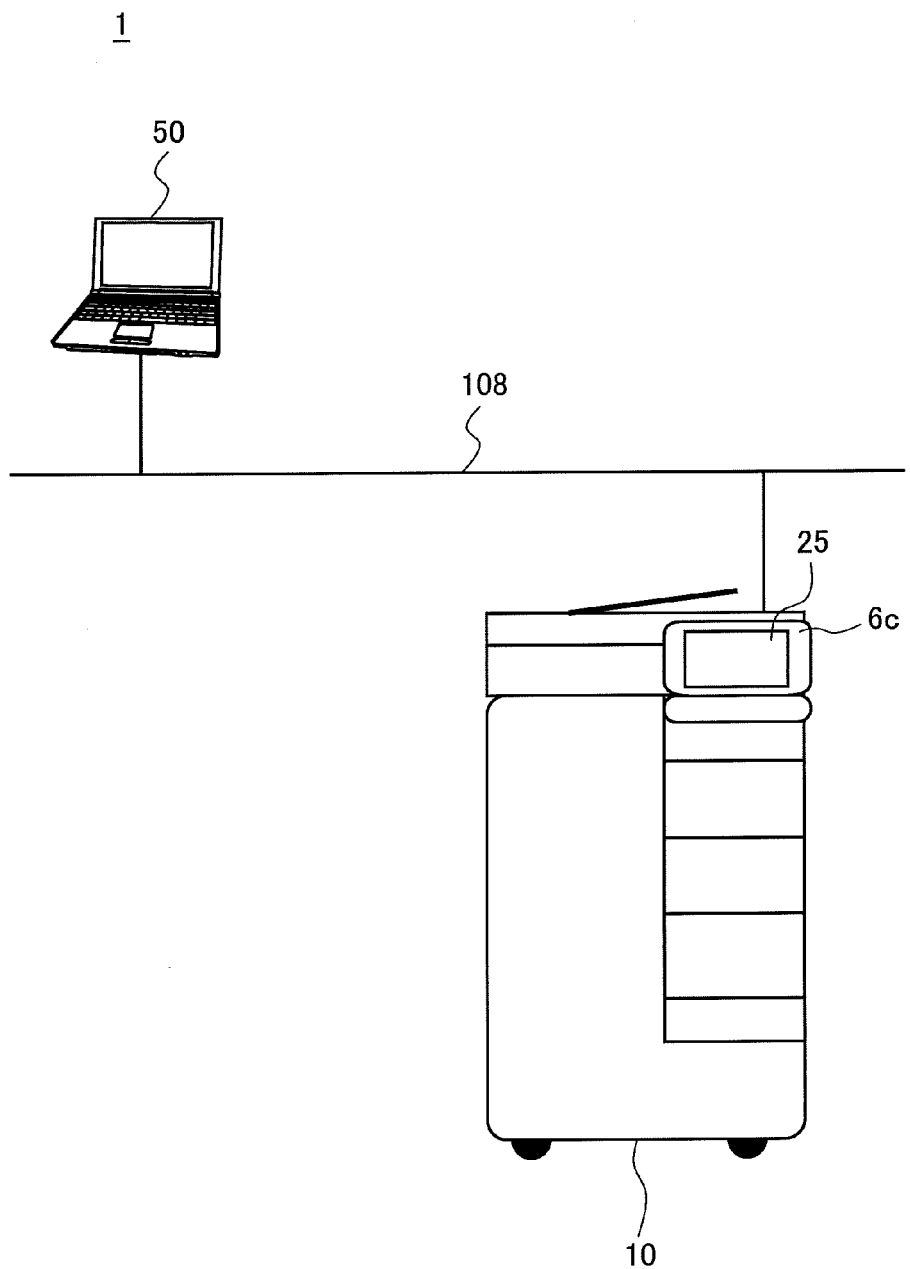
FIG. 1 illustrates an image processing system.

FIG. 1 illustrates an image processing system (also referred to as an "image forming system") according to the present invention. As illustrated in FIG. 1, the image processing system 1 includes an image processing apparatus (also referred to as an "image forming apparatus") 10 and an external device 50.

In the image processing system 1, the image processing apparatus 10 and the external device 50 are connected to each other via a network 108. The network 108 may be configured by local area networks (LANs) and the Internet. A form of connection to the network 108 may be a wired connection or a wireless connection.

In the present embodiment, the external device 50 is an information input/output terminal device (also referred to as an "information terminal" or a "communication terminal") capable of network communication with the image processing apparatus 10 and configured as a so-called personal computer. The external device 50 has installed therein a printer driver (software program) and is capable of transmitting a print job (to be more specific, print target data and an instruction to execute the print job) to the image processing apparatus 10 in accordance with a user operation by using the printer driver. Upon receiving the print job (to be more specific, the print target data and the instruction to execute the print job) transmitted from the external device 50, the image processing apparatus 10 starts printing out the print target data.

The present embodiment illustrates a mode in which a normal print job (also referred to as a "basic print job") that is started (immediately) in response to the receipt thereof from the external device 50 (to be more specific, the receipt of the print target data and the instruction to execute the job) is exchanged between the external device 50 and the image processing apparatus 10.

1-2. Configuration of Image Processing Apparatus

Figure 2:
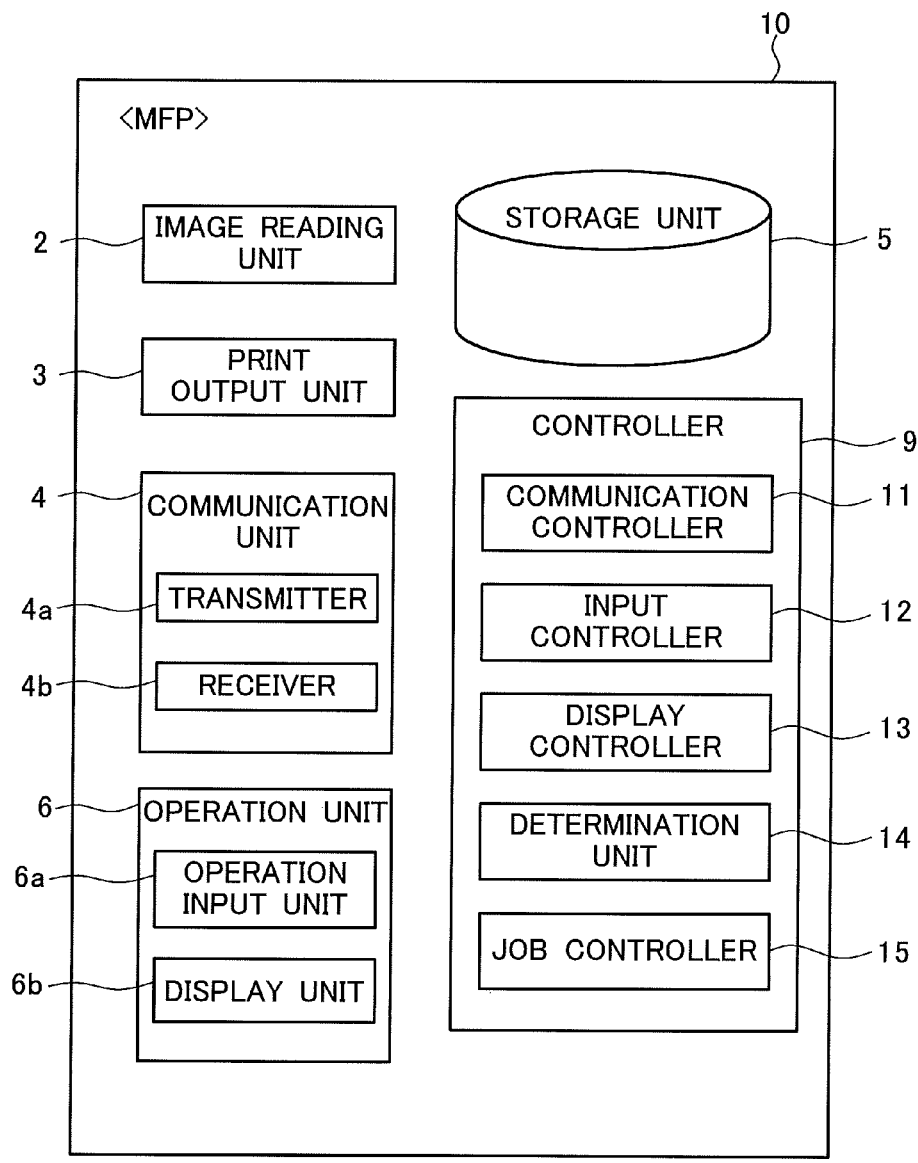
FIG. 2 illustrates functional blocks of an image processing apparatus (MFP).

FIG. 2 illustrates functional blocks of the image processing apparatus 10. Here, a Multi-Functional Peripheral (MFP) is given as an example of the image processing apparatus 10. FIG. 2 illustrates functional blocks of the MFP 10.

The MFP 10 is an apparatus (also referred to as a "multi-functional processing machine") having functions such as a scan function, a copy function, a facsimile function, and a box storage function. More specifically, the MFP 10 includes, for example, an image reading unit 2, a print output unit 3, a communication unit 4, a storage unit 5, an operation unit 6, and a controller 9 as illustrated in the functional block diagram in FIG. 2, and implements various types of functions by operating these units in combination.

The image reading unit 2 is a processing unit that optically reads (i.e., scans) an original document placed at a predetermined position on the MFP 10 and generates image data of the original document (also referred to as an "original image" or a "scanned image"). The image reading unit 2 is also referred to as a "scanning unit."

The print output unit 3 is an output unit that prints out an image on various types of media such as paper on the basis of data (print target data) regarding an object to be printed.

The communication unit 4 is a processing unit capable of facsimile communication via a public network or other networks. The communication unit 4 is also capable of network communication via the network 108. The network communication uses various types of protocols such as Transmission Control Protocol/Internet Protocol (TCP/IP). By using the network communication, the MFP 10 can transmit and receive various types of data in cooperation with desired parties (e.g., external device 50). The communication unit 4 includes a transmitter 4a that transmits various types of data (e.g., jobs), and a receiver 4b that receives various types of data.

The storage unit 5 is configured as a storage device such as a hard disk drive (HDD).

The operation unit 6 includes an operation input unit 6a that accepts operation input to the MFP 10, and a display unit 6b that displays and outputs various types of information.

The MFP 10 is provided with a substantially plate-like operation panel unit 6c (see FIG. 1). The operation panel unit 6c includes a touch panel 25 (see FIG. 1) on the front side. The touch panel 25 functions not only as part of the operation input unit 6a but also as part of the display unit 6b. The touch panel 25 is configured by embedding, for example, various types of sensors in a liquid crystal display panel, and is capable of accepting various types of operation input from an operator (login user) while displaying various types of information.

The controller 9 is a control device that is built into the MFP 10 and performs overall control of the MFP 10. The controller 9 is configured as a computer system that includes, for example, a CPU and various types of semiconductor memories (RAM and ROM). The controller 9 implements various types of processing units by causing the CPU to execute predetermined software programs (hereinafter, also simply referred to as "programs") stored in a ROM (e.g., EEPROM (registered trademark)). Alternatively, these programs (to be more specific, a group of program modules) may be recorded in a portable recording medium (or in other words, any of various types of non-transitory computer-readable recording media) such as an USB memory and installed into the MFP 10 via the recording medium. As another alternative, the programs may be downloaded via the network 108, for example, and installed into the MFP 10.

More specifically, the controller 9 implements various types of processing units including a communication controller 11, an input controller 12, a display controller 13, a determination unit 14, and a job controller 15, as illustrated in FIG. 2, by executing the programs.

The communication controller 11 is a processing unit that controls communication operations with other devices (e.g., external device 50) in cooperation with the communication unit 4 and other units. For example, the communication controller 11 receives a job assigned by a user of the external device 50 from the external device 50.

The input controller 12 is a controller that controls operations such as accepting operation input from a user to the operation input unit 6a (e.g., touch panel 25).

The determination unit 14 is a processing unit that determines whether the job received from the external device 50 is a specific type of job (e.g., "basic print job").

The display controller 13 is a processing unit that controls display operations of the display unit 6b (e.g., touch panel 25). More specifically, the display controller 13 controls display on a preview screen 200 (see, for example, FIG. 5) displayed on the touch panel 25 of the MFP 10. For example, when it is determined that a specific type of job (here, basic print job) has been received during display of the preview screen 200, the display controller 13 performs display control (also referred to as "first display control") in which preview images 250 (preview images 250 of documents) displayed on the preview screen 200 are automatically hidden.

The job controller 15 is a processing unit that controls execution of a job by the MFP 10. For example, in response to the receipt of a basic print job from the external device 50, the job controller 15 executes the basic print job (prints out print target data) in cooperation with the print output unit 3.

1-3. Operations

Figure 3:
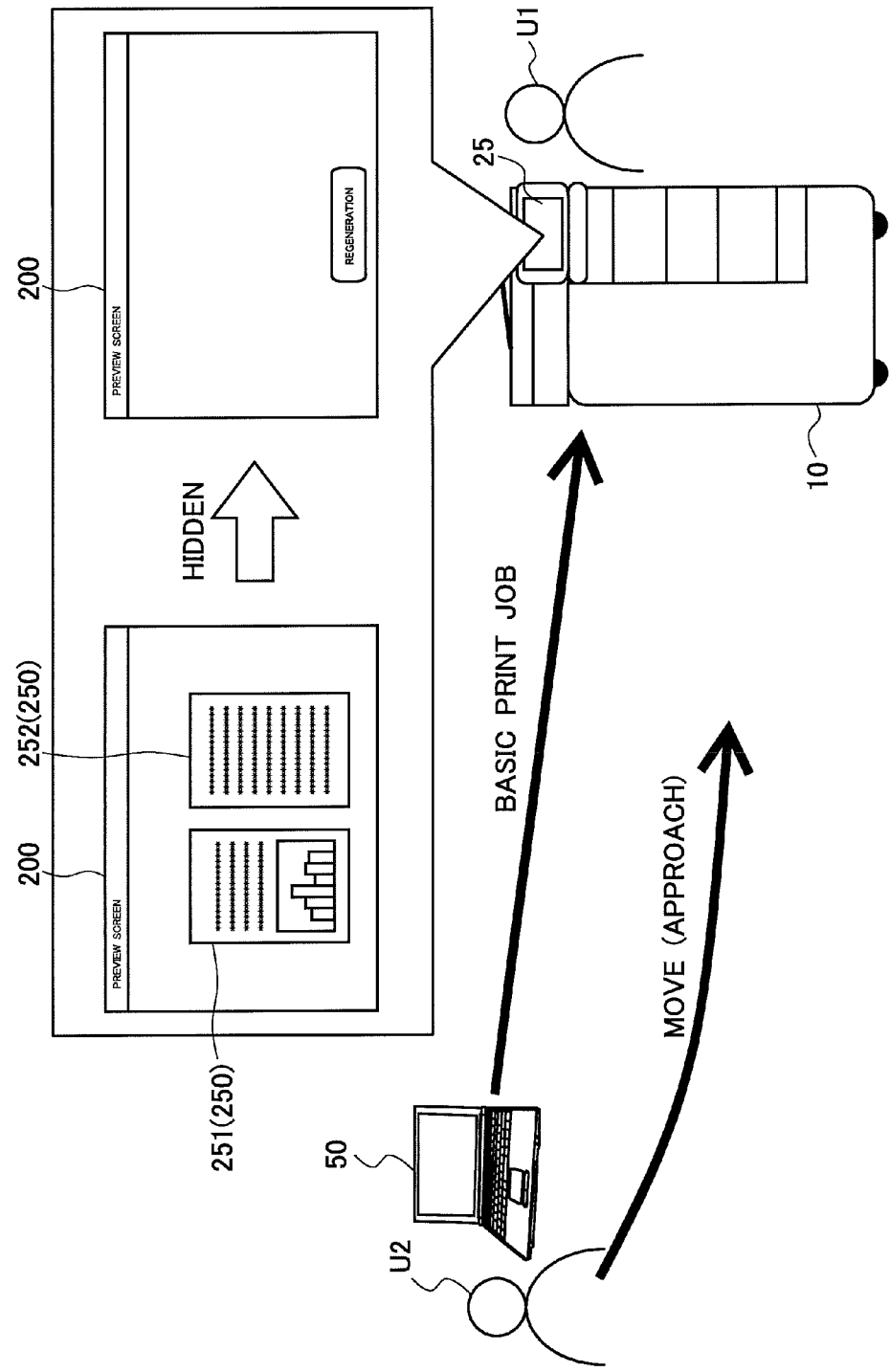
FIG. 3 illustrates the concepts of, for example, operations performed in the image processing system.

FIG. 3 schematically illustrates operations performed in the image processing system 1.

The present embodiment assumes a case where, when a login user U1 is browsing the preview images 250 of the documents displayed on the preview screen 200 of the MFP 10, another user U2 different from the login user U1 assigns a basic print job to the MFP 10 via the external device 50. If it is determined that a basic print job has been received, the MFP 10 assumes that there is a predetermined degree or more of possibility that the user U2 may approach the MFP 10. When having completed the received basic print job, the MFP 10 performs display control (first display control) in which the preview images 250 are automatically hidden on the preview screen 200.

Figure 5:
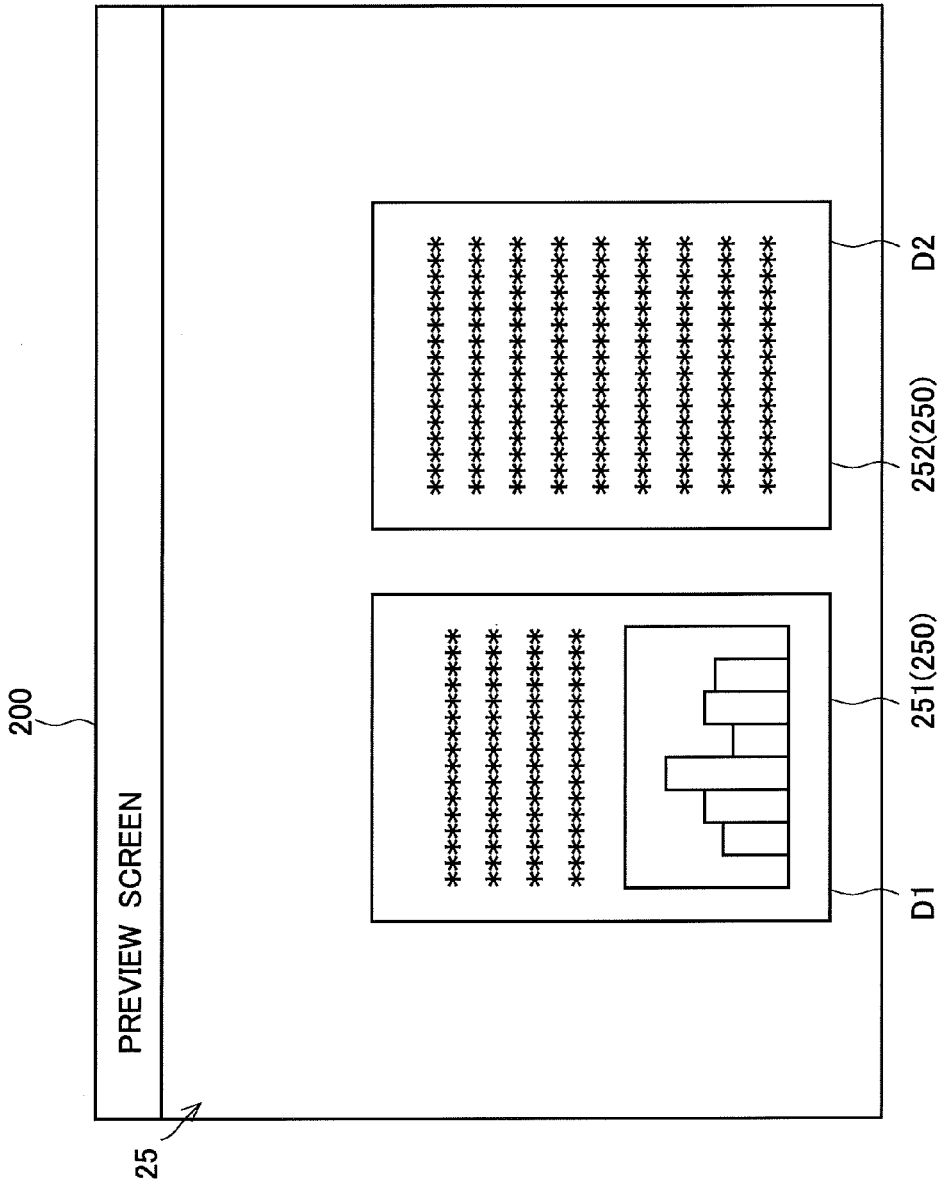
FIG. 5 illustrates a preview screen (before documents are hidden).

FIG. 5 illustrates the preview screen 200. Here, the user U1 has logged in to the MFP 10 and caused the preview screen 200 to be displayed on the touch panel 25 of the MFP 10 through various operations. The preview screen 200 displays preview images 250 (251, 252) of a plurality of documents (here, two documents D1 and D2) stored in, for example, the storage unit 5 of the MFP 10. The present invention is, however, not limited to this example, and the preview screen 200 may display preview images 250 of a plurality of pages of a single document.

In the present embodiment, the user U2 transmits a basic print job (print job that is started in response to the receipt thereof from the external device 50) to the MFP 10 via the external device 50 while the user U1 is logged in and the preview screen 200 is displayed on the touch panel 25 of the MFP 10 (see also FIG. 3). In response to the receipt of the basic print job from the external device 50, the MFP 10 (job controller 15) executes the basic print job (prints out print target data).

Figure 4:
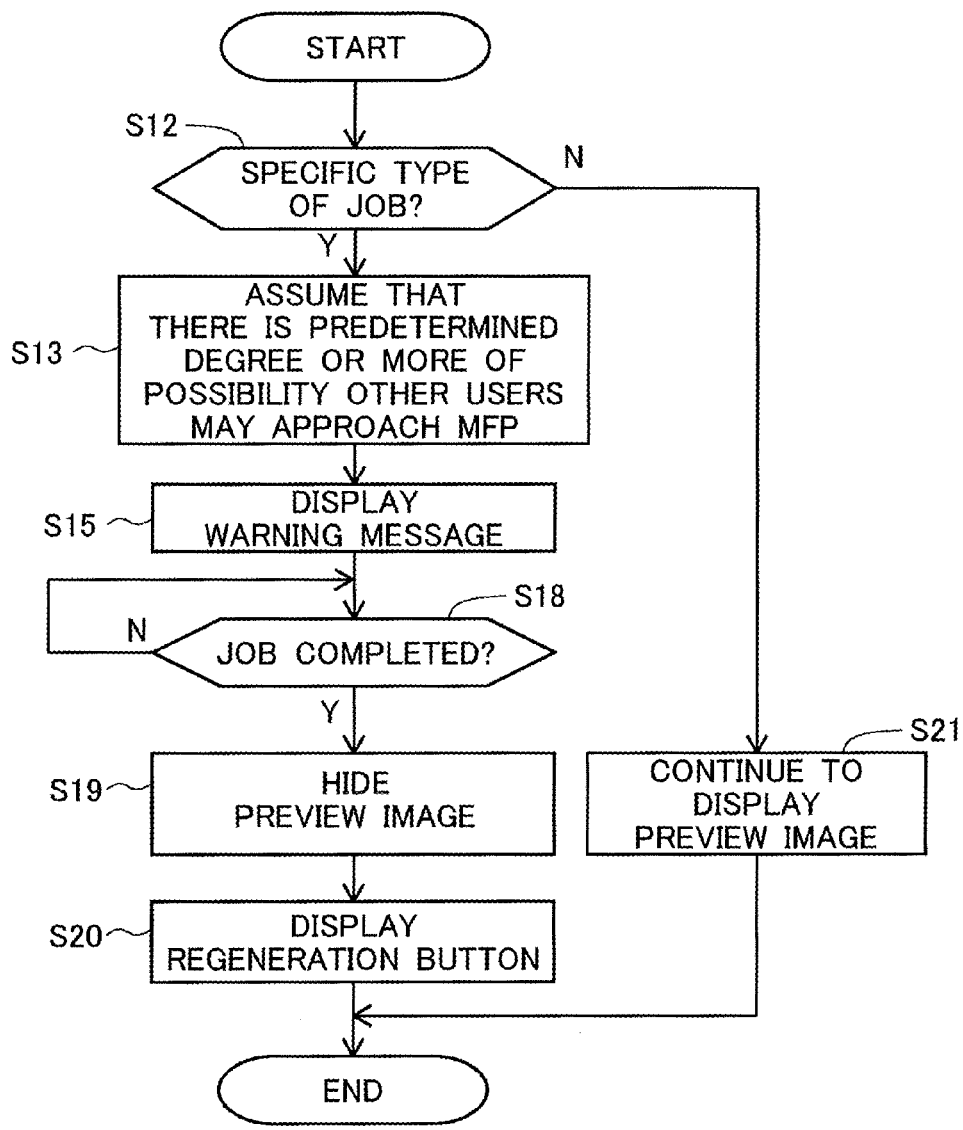
FIG. 4 is a flowchart of operations performed by the MFP.

FIG. 4 is a flowchart of operations performed by the MFP 10. The process in FIG. 4 is started upon receipt of a job from the external device 50. The following description is given with reference to FIG. 4 and other drawings.

First, the MFP 10 (determination unit 14) determines whether the job received from the external device 50 is a specific type of job (here, basic print job) (step S12).

For example, if it is determined in step S12 that a job (e.g., box storage job described later) other than the specific type of job (here, basic print job) has been received, the process proceeds to step S21. Note that the box storage job is a job in which data in the external device 50 is transmitted from the external device 50 to the MFP 10 and stored in the MFP 10.

In step S21, it is determined to continue to display the preview images 250 on the preview screen 200 (i.e., not to perform first display control). If a determination is made to continue to display the preview images 250, the preview images 250 continue to be displayed on the preview screen 200 not only after the receipt of the job (e.g., box storage job) from the external device 50 but also even after completion of the job.

On the other hand, if it is determined in step S12 that a specific type of job (here, basic print job) has been received, the process proceeds to step S13.

In step S13, the MFP 10 (display controller 13) assumes (determines) that there is a predetermined degree or more of possibility that another user (to be more specific, a job execution user, or here the user U2, who has assigned the basic print job via the external device 50) may approach the MFP 10. That is, if a job that generates a receiving object (e.g., a printout generated as a result of the print job) that is to be received at the MFP 10 after completion of the job has been received from the external device 50, it is assumed that there is a predetermined degree or more of possibility that the job execution user may approach the MFP 10. The process then proceeds to step S15.

Figure 6:
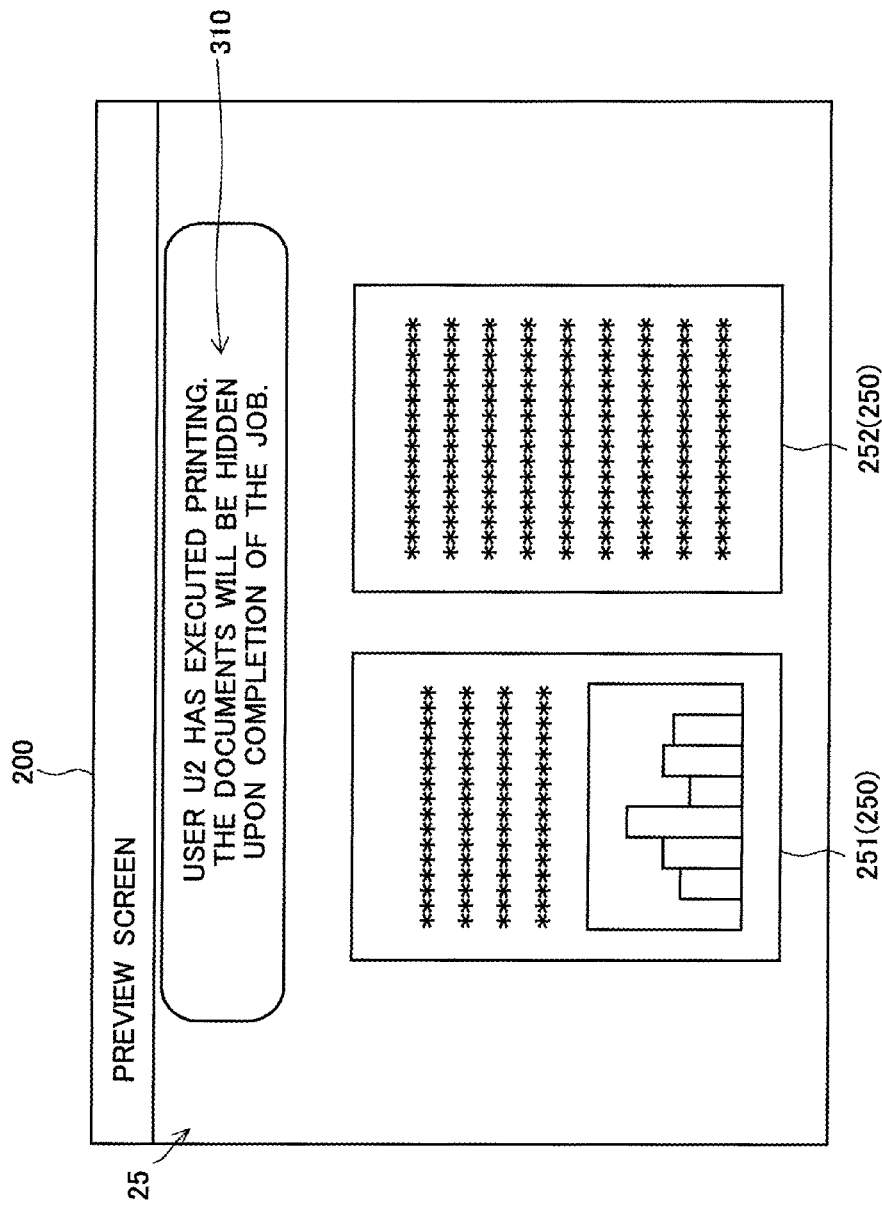
FIG. 6 illustrates the preview screen (before the documents are hidden).

In step S15, a warning message 310 is displayed on the preview screen 200, the warning message warning of the approach of another user (to be more specific, the job execution user U2 of the basic print job) to the MFP 10 (see FIG. 6).

More specifically, the MFP 10 identifies the job execution user (here, user U2) who has assigned the basic print job, on the basis of data such as a user ID included in job information about the received basic print job. The MFP 10 (display controller 13) then displays the warning message 310 such as "The user U2 has executed printing. The documents will be hidden upon completion of the job" on the preview screen 200 as illustrated in FIG. 6. The login user U1 who saw the warning message 310 will understand that the job execution user U2 may approach the MFP 10 and that the documents will be hidden after completion of the basic print job.

In step S18, the MFP 10 stands by for completion of the job (here, basic print job) received from the external device 50, and when the basic print job is completed (the printing out of all print target data in the basic print job is completed), the process proceeds to step S19.

Figure 7:
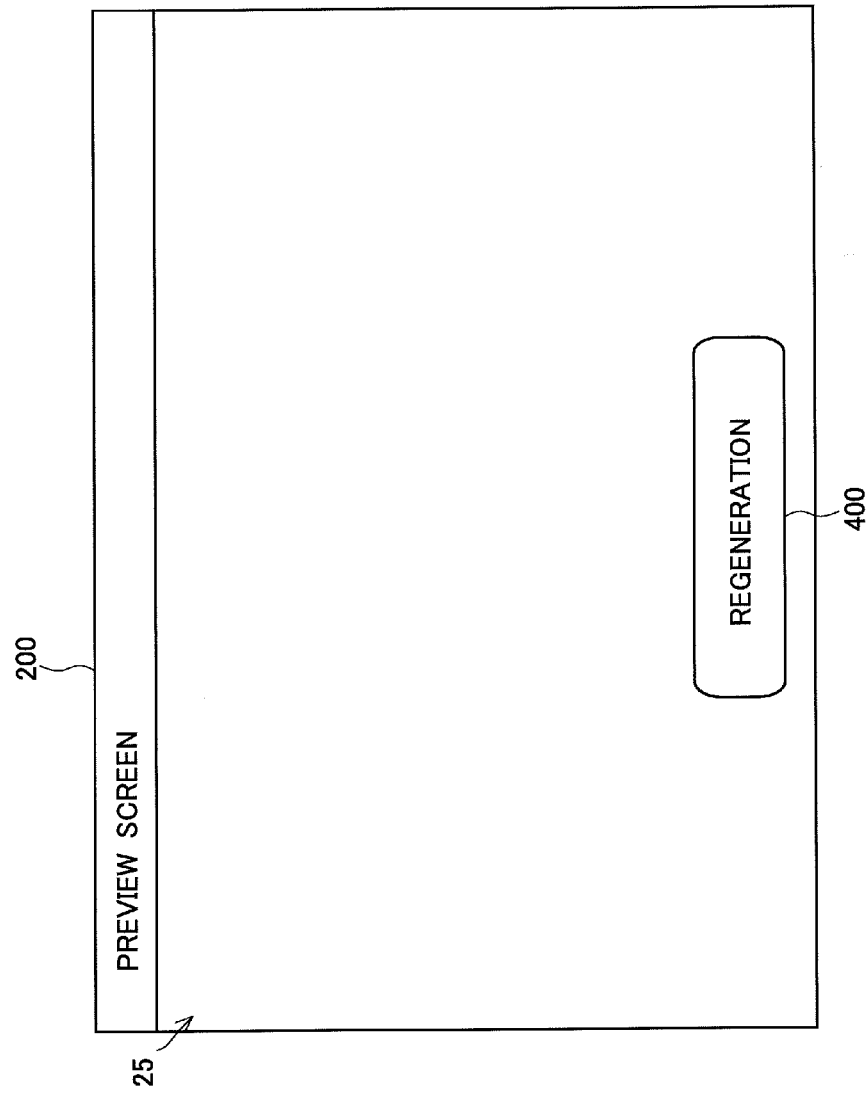
FIG. 7 illustrates the preview screen (after the documents are hidden).

In step S19, the MFP 10 (display controller 13) automatically hides the preview images 250 on the preview screen 200 (performs first display control). FIG. 7 illustrates the preview screen 200 after the first display control. As illustrated in FIG. 7, the preview images 250 (here, both of the preview images 251 and 252 of the documents D1 and D2; see FIG. 5) that have been displayed on the preview screen 200 are automatically hidden.

In this way, in the present embodiment, if the MFP 10 has received a basic print job from the external device 50 during display of the preview screen 200, the preview images 250 of the documents displayed on the preview screen 200 are automatically hidden in response to completion of the basic print job.

The process then proceeds to step S20. More specifically, when the preview images 250 are hidden on the preview screen 200, a regeneration button 400 (see FIG. 7) for regenerating the hidden preview images 250 (here, preview images 251 and 252) is displayed on the preview screen 200 (step S20).

After completion of the basic print job, the job execution user U2 of the basic print job will approach the MFP 10 and receive a printout at the MFP 10. The login user U1 presses the regeneration button 400 after confirming that the user U2 has received the printout and left the MFP 10. When the regeneration button 400 is pressed, the hidden preview images 250 (here, preview images 251 and 252 of the documents D1 and D2) are displayed again on the preview screen 200 (see FIG. 5).

As described above, in the operations according to first embodiment, if a specific type of job (here, basic print job) is received from the external device 50, it is assumed that there is a predetermined degree or more of possibility that another user (to be more specific, job execution user U2) different from the login user U1 may approach the MFP 10. Then, the preview images 250 (251, 252) of the documents (D1, D2) are automatically hidden on the preview screen 200. That is, if a type of job that generates a receiving object (e.g., a printout generated as a result of the basic print job) that is to be received at the MFP 10 after completion of the job has been received from the external device 50, the preview images 250 of the documents are automatically hidden as a preparation to possible approach of the user of the external device 50 (approach to receive the printout). Accordingly, it is possible to suppress the occurrence of another user (here, job execution user U2) peeking at the documents displayed on the preview screen 200 of the MFP 10 while taking into consideration the possibility of approach of the other user to the MFP 10.

Here, it is conceivable that many users will approach the MFP 10 and receive a receiving object (e.g., printout) after completion of jobs they have assigned via the external device 50. In other words, there will be a relatively small number of job execution users who will approach the MFP 10 before completion of the jobs received from the external device 50.

The inventors of the present invention have focused on this point, and in the above first embodiment, the preview images 250 continue to be displayed on the preview screen 200 until completion of a specific type of job (here, basic print job) received from the external device 50, and then the preview images 250 are automatically hidden upon completion of the job. As a result, the duration of time that the login user U1 stands by for the approach of the job execution user U2 while the preview images 250 are hidden is shortened as compared with the case where the preview images 250 are immediately hidden in response to the receipt of a specific type of job. Hence, a reduction in the operating efficiency of the login user U1 will be suppressed.

While the above-described first embodiment illustrates a mode in which, when a basic print job is received, it is assumed that there is a predetermined degree or more of possibility that another user (to be more specific, job execution user U2) different from the login user U1 may approach the MFP 10 (step S13), the present invention is not limited to this example.

For example, a case is also conceivable in which, when a pull scan job (described next) is received, it is assumed that there is a predetermined degree or more of possibility that another user (job execution user U2) may approach the MFP 10. Note that the pull scan job is a scan job that is started in response to receipt thereof from the external device 50.

Figure 8:
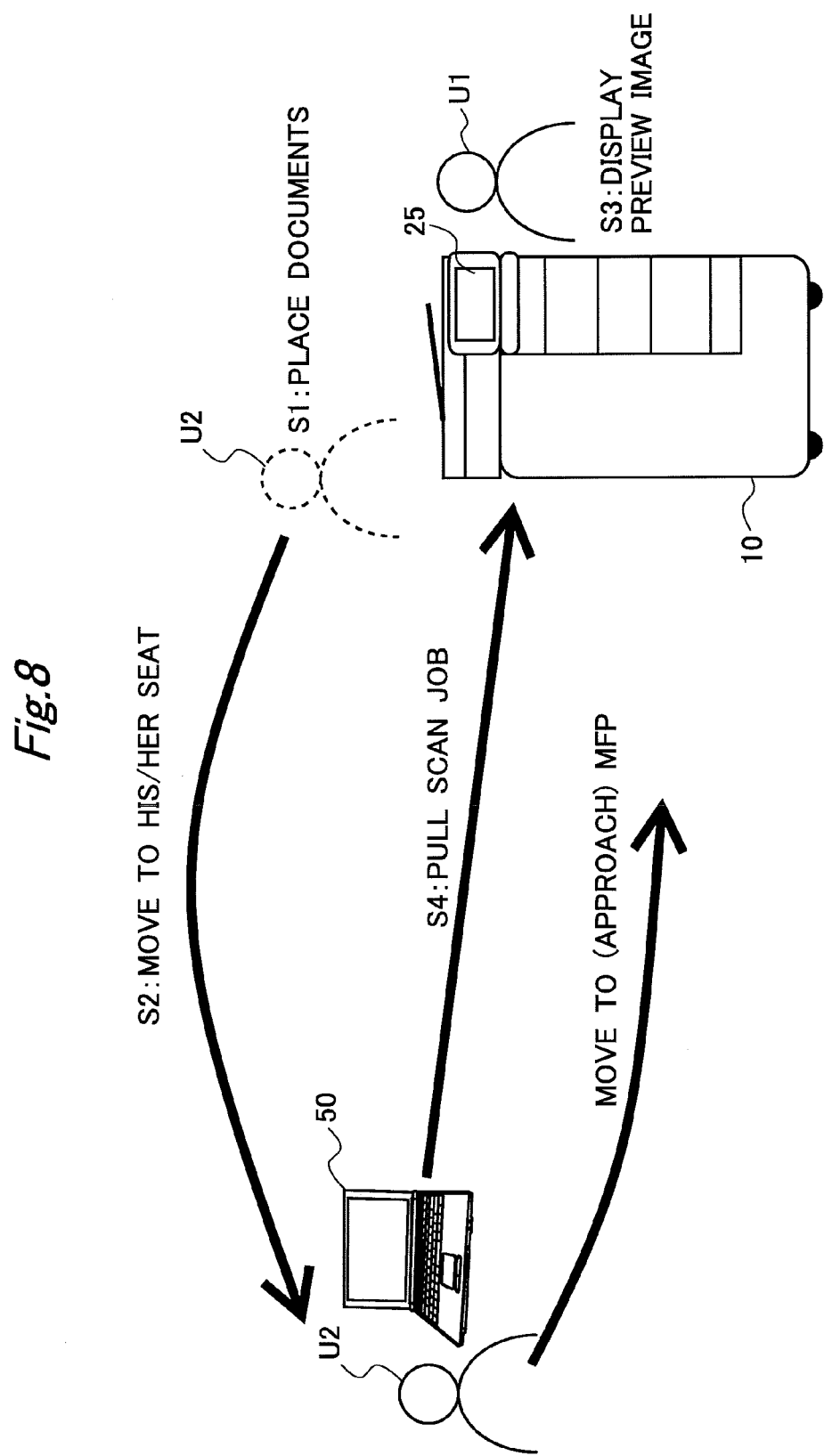
FIG. 8 illustrates an outline of operations performed by a login user and a job execution user during a pull scan job.

FIG. 8 illustrates an overview of operations performed by the login user U1 and the job execution user U2 during the pull scan job.

The user U2 places an original document at a predetermined position on the MFP 10 (step S1) and then moves to his or her seat (i.e., to the external device 50 where his or her seat is situated) (step S2). After that, the user U1 is logged in to the MFP 10 and causes the preview screen 200 to be displayed on the touch panel 25 of the MFP 10 (step S3). Thereafter, when the user U2 has assigned a pull scan job to the MFP 10 via the external device 50, the pull scan job (to be more specific, an instruction to execute the job) is transmitted from the external device 50 to the MFP 10 (step S4). When the pull scan job is received from the external device 50, the MFP 10 starts the pull scan job and also assumes that there is a predetermined degree or more of possibility that the job execution user U2 of the pull scan job may approach the MFP 10 (step S13). When the pull scan job is completed (i.e., all original documents are read and scan images of all of the original documents are generated) (step S18), the preview images 250 of the documents are automatically hidden on the preview screen 200 (step S19).

In this way, when the pull scan job is received from the external device 50, it may be assumed that there is a predetermined degree or more of possibility that another user (to be more specific, job execution user) different from the login user may approach the MFP 10.

While the above-described first embodiment illustrates a mode in which when a specific type of job (e.g., basic print job) received from the external device 50 is completed, the first display control is performed in which the preview images 250 are automatically hidden on the preview screen 200, the present invention is not limited to this example.

For example, the first display control may be performed if an expected approach duration Tb has elapsed after the receipt of a specific type of job from the external device 50, the expected approach duration being a duration of time during which the job execution user is expected to approach the MFP 10.

FIG. 9 is a diagram for explaining, for example, calculation of the expected approach duration Tb.

More specifically, the MFP 10 includes a measuring unit (counting unit) that measures in advance a duration of time from when a job assigned by the job execution user via the external device 50 is received to when the job execution user receives a receiving object to be received at the MFP 10 after completion of the job.

For example, when the user U2 has assigned a basic print job to the MFP 10 via the external device 50, the measuring unit measures a receiving duration (e.g., 10 seconds) from when the basic print job assigned by the user U2 via the external device 50 is received to when the user U2 receives a printout at the MFP 10. When the user U2 has assigned a pull scan job to the MFP 10 via the external device 50, the measuring unit measures a receiving duration (e.g., 15 seconds) from when the pull scan job assigned by the user U2 via the external device 50 is received to when the user U2 receives a document at the MFP 10. Note that whether the user has received the receiving object (e.g., printout or document) may be determined by using, for example, a sensor.

Then, the MFP 10 calculates an average receiving duration Ta by averaging the receiving durations measured for a plurality of jobs assigned by the user U2, and stores in advance the calculated average receiving duration Ta in association with the user U2 in the storage unit 5. Here, the average receiving duration Ta of 10 seconds is stored in association with the user U2 in the storage unit 5 of the MFP 10 (see also FIG. 9). The MFP 10 also calculates the expected approach duration Tb on the basis of the average receiving duration Ta for the user U2 and stores in advance the expected approach duration Tb in association with the user U2 in the storage unit 5, the expected approach duration Tb being a duration of time during which the user U2 is expected to approach the MFP 10 after receipt of the job assigned by the user U2. Here, a duration of time that is shorter by a predetermined duration $\Delta T$ (e.g., two seconds) than the average receiving duration Ta (here, 10 seconds) for the user U2 is stored in advance as the expected approach duration Tb ($=Ta-\Delta T$) (e.g., eight seconds) in association with the user U2 in the storage unit 5.

Thereafter, if it is determined in step S12 that a basic print job assigned by the user U2 via the external device 50 has been received, the first display control may be performed if the expected approach duration Tb (here, eight seconds) stored in association with the user U2 has elapsed after the receipt of the basic print job.

Alternatively, the first display control may be performed if the progress of the basic print job started by the MFP 10 has reached a predetermined degree.

For example, when the number of unprocessed (remaining) pages in the basic print job started by the MFP 10 becomes smaller than a predetermined number of pages (e.g., five pages), the preview images 250 may be automatically hidden on the preview screen 200.

As another alternative, when the amount of unprocessed (remaining) data in the basic print job started by the MFP 10 becomes smaller than a predetermined amount (e.g., 500 kilobytes), the preview images 250 may be automatically hidden on the preview screen 200.

As yet another alternative, when a predetermined ratio (e.g., 90%) or more of the basic print job started by the MFP 10 is completed, the preview images 250 may be automatically hidden on the preview screen 200.

In this way, the first display control in which the preview images 250 are automatically hidden on the preview screen 200 may be performed if the progress of the basic print job started by the MFP 10 has reached a predetermined degree. This variation (mode in which the progress of the basic print job is taken into consideration) is in particular useful in cases such as where the total number of pages in the basic print job is larger than a fixed number of pages (e.g., 10 pages) or where the total amount of data in the basic print job is greater than a fixed amount of data (e.g., 1 megabytes).

2. Second Embodiment

A second embodiment is a variation of the first embodiment. The following description mainly focuses on differences from the first embodiment.

The above-described first embodiment illustrates a mode in which, when it is determined that a specific type of job has been received, the first display control is performed in which the preview images 250 are automatically hidden on the preview screen 200.

The second embodiment illustrates a mode in which, when it is determined that a specific type of job has been received, display control (also referred to as "second display control") is performed in which a non-display button 360 for hiding the preview images 250 in accordance with a user operation is displayed on the preview screen 200.

The second embodiment also assumes a situation where the user U2 transmits a basic print job to the MFP 10 via the external device 50 while the user U1 is logged in to the MFP 10 and the preview images 251 and 252 of the documents D1 and D2 are displayed on the preview screen 200 (see FIG. 5).

Figure 10:
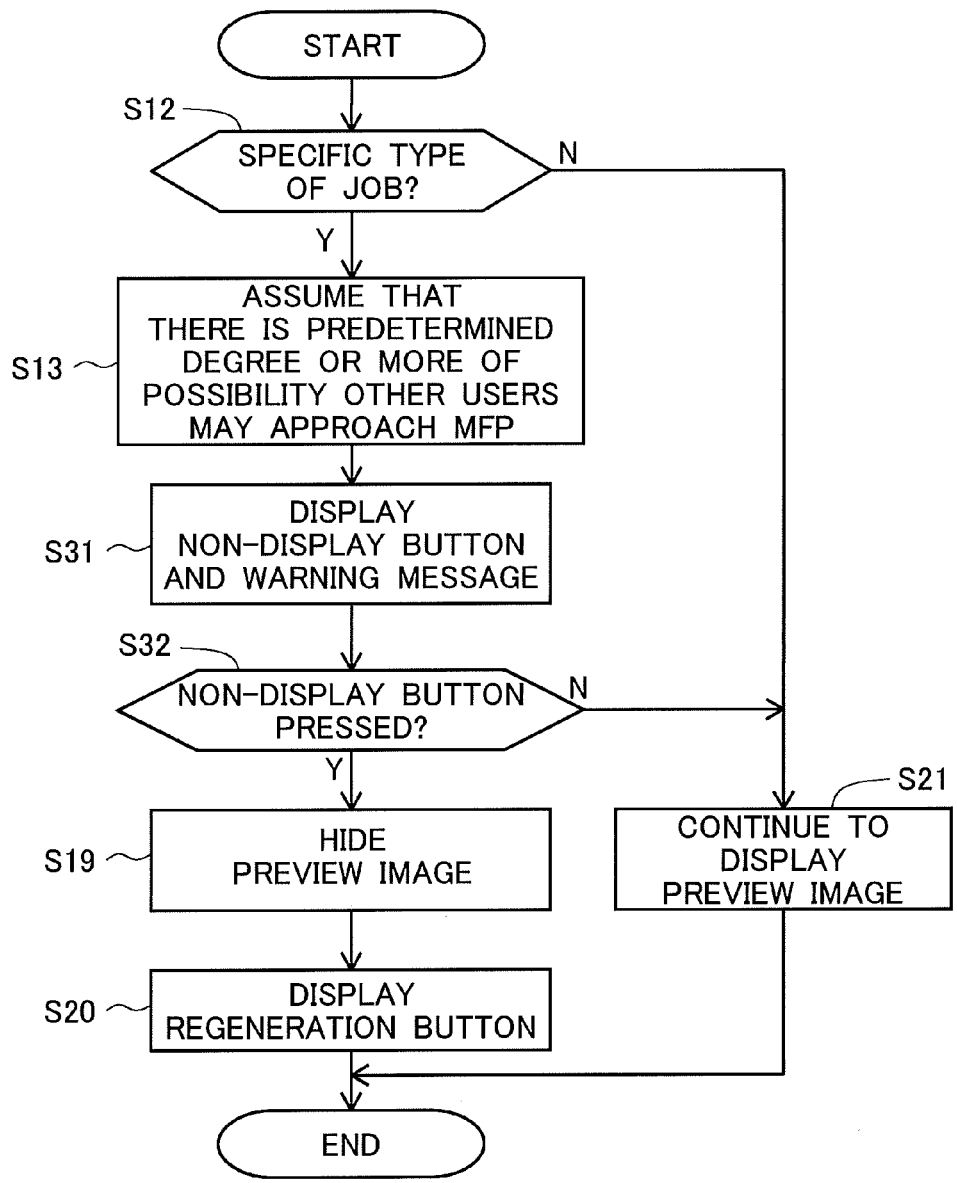
FIG. 10 is a flowchart of operations performed by the MFP according to a second embodiment.

FIG. 10 is a flowchart of operations performed by the MFP 10 according to the second embodiment. The second embodiment differs from the above-described first embodiment in that processing of steps S31 and S32 is performed. Note that the processing of steps S12, S13, and S19 to S21 in FIG. 10 is performed in the same manner as in the above-described first embodiment (FIG. 4).

More specifically, if it is determined in step S12 that a specific type of job (here, basic print job) has been received, it is assumed in step S13 that there is a predetermined degree or more of possibility that another user (here, job execution user U2) different from the login user U1 may approach the MFP 10, and the process proceeds to step S31.

In step S31, the MFP 10 (display controller 13) performs display control (second display control) in which the non-display button 360 (see FIG. 11) is displayed on the preview screen 200. The non-display button 360 is a button for (immediately) hiding the preview images 250 of the documents (here, the preview images 251 and 252 of the documents D1 and D2) displayed as a preview in accordance with a user operation.

Figure 11:
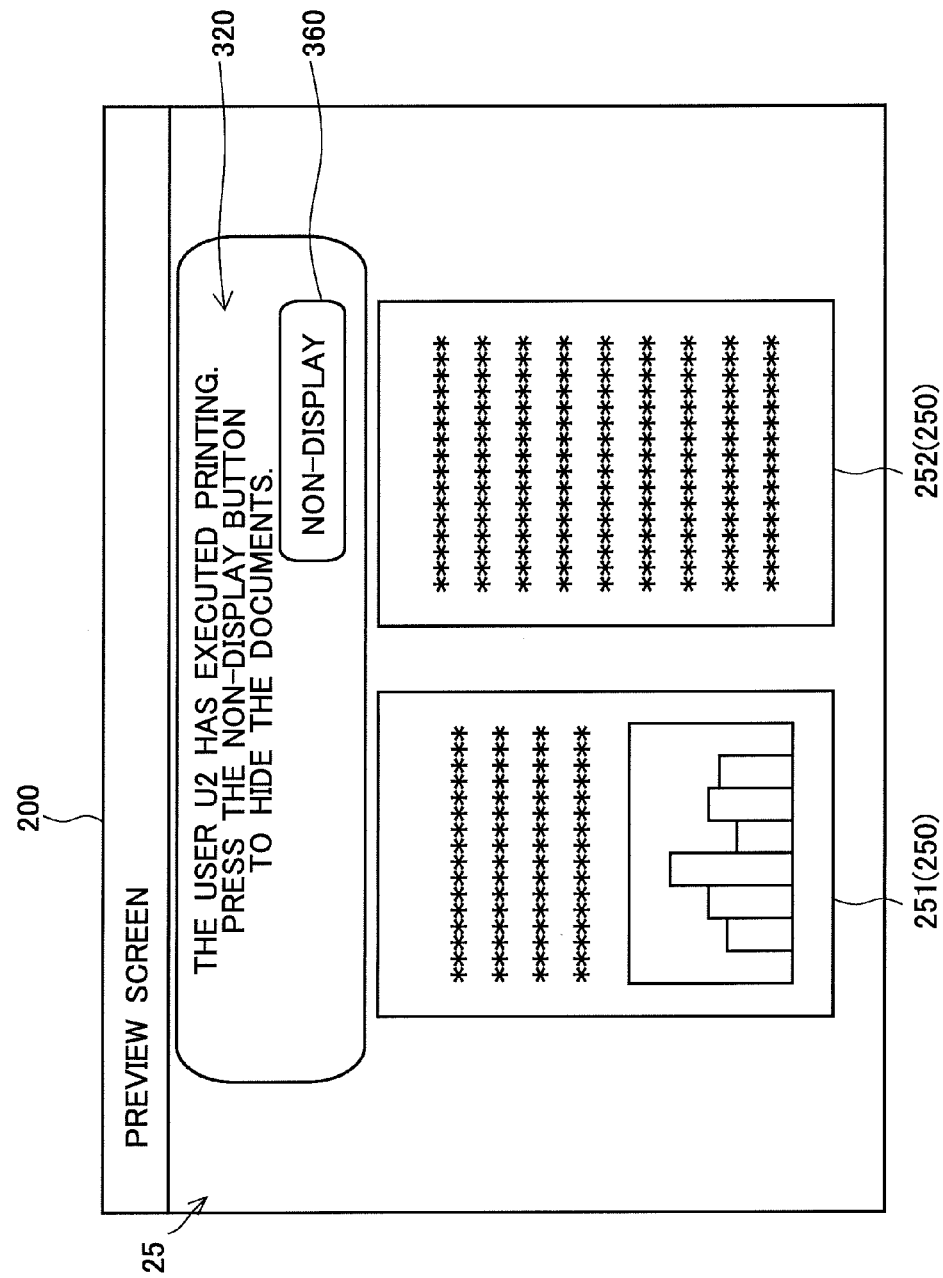
FIG. 11 illustrates a preview screen (before the documents are hidden) according to the second embodiment.

In step S31 (second display control), a warning message 320 that warns of approach of another user (here, job execution user U2) to the MFP 10 is also displayed on the preview screen 200 (see FIG. 11). More specifically, the warning message 320 such as "The user U2 has executed printing. Press the non-display button to hide the documents" as illustrated in FIG. 11 is displayed on the preview screen 200.

Then, it is determined in step S32 whether the non-display button 360 has been pressed. For example, the login user U1 may press the non-display button 360 at arbitrary timing (e.g., when the login user U1 has confirmed that the job execution user U2 of the basic print job left his or her seat) while looking out for the approach of other users (in particular, job execution user U2) to the MFP 10.

When the non-display button 360 is pressed by the login user U1, the preview images 250 (251, 252) are immediately hidden on the preview screen 200 (see FIG. 7) (step S19), and the regeneration button 400 is displayed on the preview screen 200 (step S20).

In this way, in the second embodiment, when a specific type of job (here, basic print job) has been received from the external device 50, the non-display button 360 for hiding the preview images 250 of the documents displayed as a preview in accordance with a user operation is displayed on the preview screen 200. This enables the login user U1 to hide the documents after having visually recognized the approach of other users to the MFP 10. It is thus possible to suppress the occurrence of other users peeking at the documents displayed on the preview screen 200 of the MFP 10 while taking into consideration the possibility of approach of other users (here, user U2) to the MFP 10.

In the above-described second embodiment, when it is determined that a basic print job has been received during display of the preview screen 200, the warning message 320 (see FIG. 11) for warning of the approach of other users (to be more specific, job execution user U2) to the MFP 10 is displayed on the preview screen 200. The display of the warning message enables the login user U1 to recognize the risk of approach of other users (job execution user U2) to the MFP 10, and prompts the login user U1 to caution that other users may peek at the documents displayed as a preview.

While the above-described second embodiment illustrates a mode in which, when a basic print job has been received, it is assumed (step S13) that there is a predetermined degree or more of possibility that another user (to be more specific, job execution user U2) different from the login user U1 may approach the MFP 10, the present invention is not limited to this example.

For example, when a pull scan job has been received, it may be assumed in step S13 that there is a predetermined degree or more of possibility that another user (to be more specific, job execution user) different from the login user U1 may approach the MFP 10.

As another alternative, when a confidential print job (described below) has been received, it may be assumed that there is a predetermined degree or more of possibility that the other user (job execution user) may approach the MFP 10.

The confidential print job is a print job in which print target data received from the external device 50 is temporarily stored in the MFP 10 and then starts to be printed out in response to a user operation at the MFP 10. More specifically, when a confidential print job (to be more specific, print target data) has been received from the external device 50, the MFP 10 temporarily stores the print target data of the confidential print job in the MFP 10, instead of immediately starting execution of the print job. The job execution user of the confidential print job moves to the MFP 10 after having transmitted the confidential print job to the MFP 10 via the external device 50, and performs a predetermined user operation (e.g., input of authentication information) to instruct the start of printing-out. When the predetermined user operation by the job execution user has been accepted on the touch panel 25 of the MFP 10, the printing-out of the print target data stored in the MFP 10 is started in response to the predetermined user operation.

In the second embodiment, when a confidential print job (to be more specific, print target data in the confidential print job) has been received from the external device 50, it may be assumed in step S13 that there is a predetermined degree or more of possibility that the job execution user of the confidential print job may approach the MFP 10.

As yet another alternative, when a facsimile receiving job has been received, it may be assumed in step S13 that there is a predetermined degree or more of possibility that other users different from the login user U1 may approach the MFP 10. For example, if it is determined in step S12 that a facsimile receiving job has been received from the external device, it may be assumed that other users different from the login user U1 (e.g., a user who will receive a facsimile in the facsimile reception job, or a user different from either the login user U1 or the user who will receive the facsimile) may approach the MFP 10.

In the above-described second embodiment, the progress of a specific type of job may also be displayed on the preview screen 200 in step S31 (second display control in which the non-display button 360 is displayed on the preview screen 200).

Figure 12:
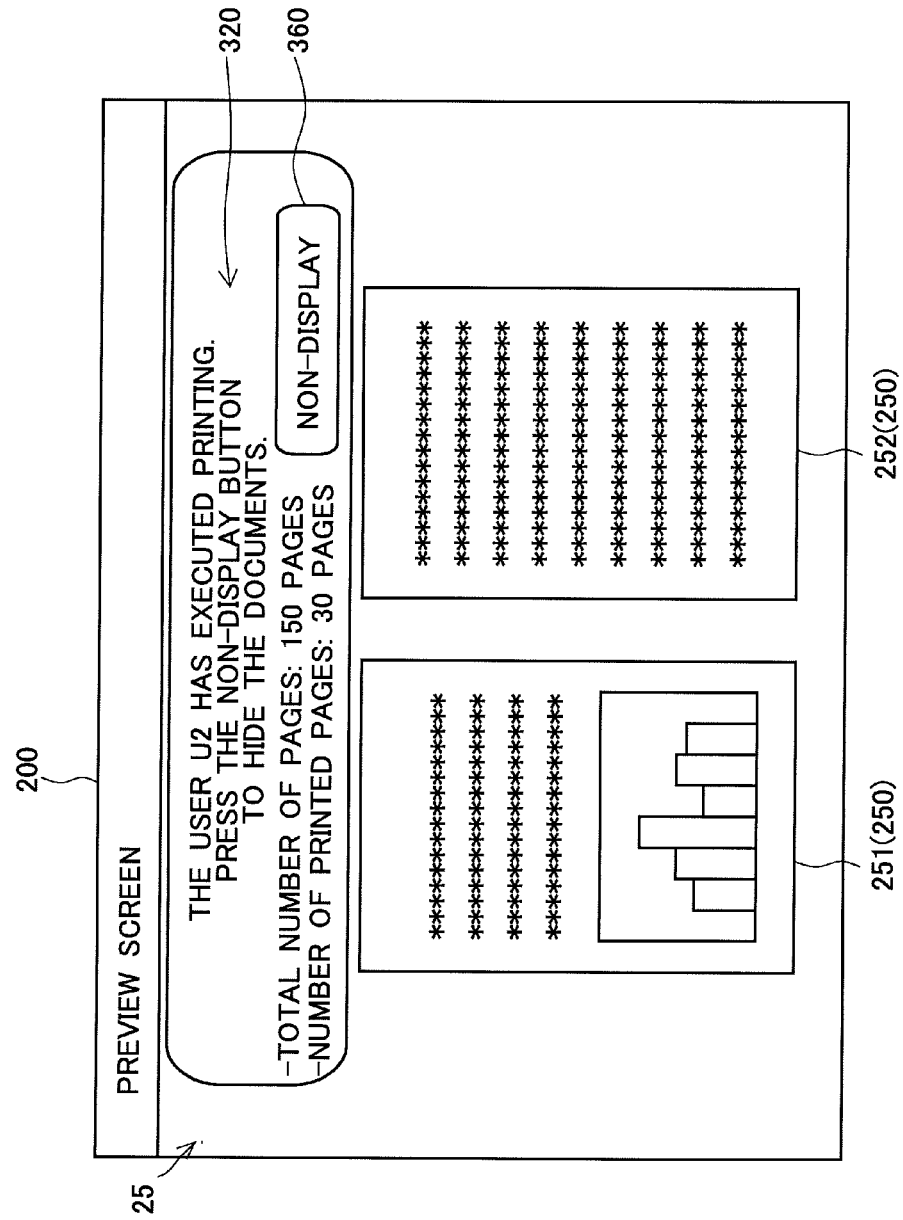
FIG. 12 illustrates a preview screen (before the documents are hidden) according to a variation of the second embodiment.

For example, when a basic print job has been received, the MFP 10 acquires the number of pages (total number of pages) to be printed in the basic print job, on the basis of job information about the basic print job. The MFP 10 further acquires the number of processed pages (the number of printed pages) in the basic print job started by the MFP 10. Then, in the second display control in step S31, the total number of pages and the number of processed pages (printed pages) in the basic print job are also displayed together with the non-display button 360 on the preview screen 200 (see FIG. 12). Thereafter, the login user U1 presses the non-display button 360 after confirming, for example, that the number of printed pages has reached approximately 90% of the total number of pages.

In this way, in step S31 (second display control), the progress of a specific type of job (here, basic print job) may also be displayed on the preview screen 200. This enables the login user U1 to estimate the time when another user (job execution user U2) approaches the MFP 10, while looking out for the progress of the specific type of job (here, basic print job) being executed by the MFP 10. Note that the information displayed as the progress of the job on the preview screen 200 is not limited to the total number of pages and the number of processed pages, and may be the total amount of data and the amount of processed data (printed data), or the remaining time of the job. Alternatively, only the number of processed pages (or the amount of processed data) in the specific type of job may be displayed on the preview screen 200 as the information indicating the progress of the job.

3. Third Embodiment

A third embodiment is a variation of the first embodiment. The following description mainly focuses on differences from the first embodiment.

In the third embodiment, the second display control in which the non-display button 360 is displayed on the preview screen 200 is performed prior to the first display control in which the preview images 250 are automatically hidden on the preview screen 200.

Figure 13:
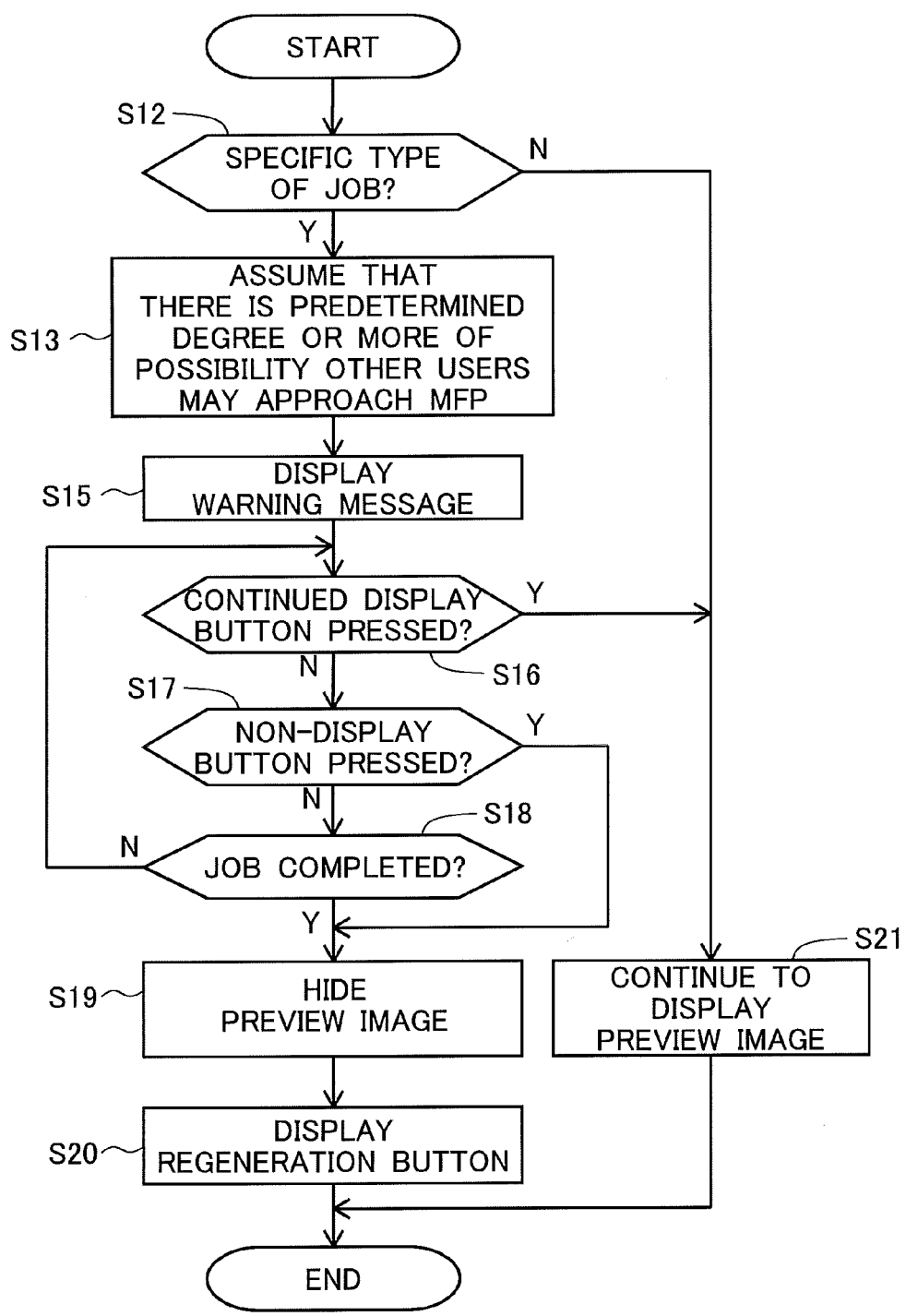
FIG. 13 is a flowchart of operations performed by the MFP according to a third embodiment.

FIG. 13 is a flowchart of operations performed by the MFP 10 according to the third embodiment. In the third embodiment, processing of steps S16 and S17 is performed between steps S15 and S18 of the above-described first embodiment (see FIG. 4) as illustrated in FIG. 13.

More specifically, when it is determined in step S12 that a specific type of job (e.g., basic print job) has been received and it is assumed in step S13 that there is a predetermined degree or more of possibility that the job execution user U2 may approach the MFP 10, the warning message 310 is displayed on the preview screen 200 (step S15).

Figure 14:
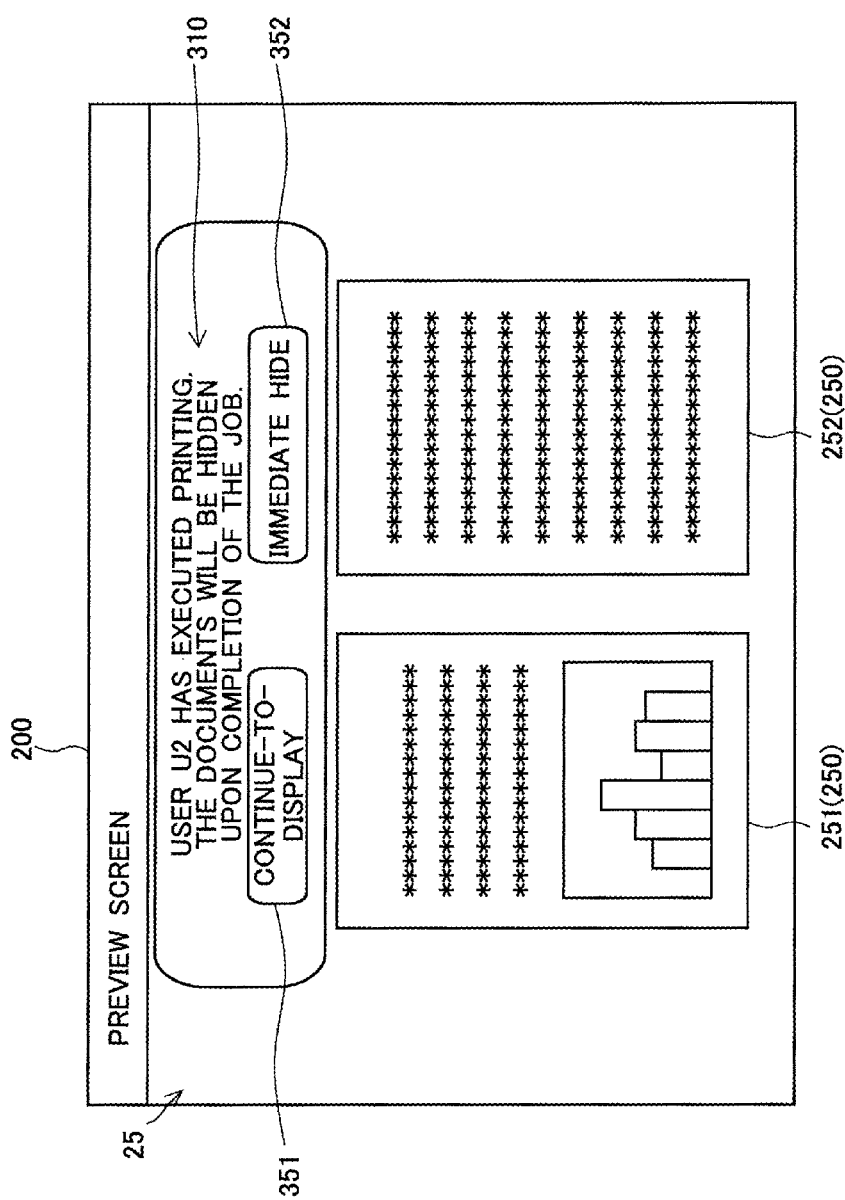
FIG. 14 illustrates a preview screen (before the documents are hidden) according to the third embodiment.

In step S15 of the third embodiment, the MFP 10 (display controller 13) displays not only the warning message 310 but also a non-display button 352 and a continued display button 351 on the preview screen 200 (see FIG. 14). The non-display button 352 ("Immediate Hide" button in FIG. 14) is a button for immediately hiding the preview images 250 on the preview screen 200. The continued display button 351 ("Continue-to-Display" button in FIG. 14) is a button for continuing to display the preview images 250 on the preview screen 200 without hiding them.

In steps S16 and S17, it is determined whether the continued display button 351 or the non-display button 352 is pressed.

For example, if the login user U1 has determined that it is OK for other users to peek at the documents (here, documents D1 and D2) displayed as a preview, the login user U1 may press the continued display button 351. When the continued display button 351 is pressed by the login user U1, the process proceeds from step S16 to step S21. Then, a determination is made to continue to display the preview images 251 and 252 of the documents D1 and D2 on the preview screen 200 (step S21), even if it is assumed in step S13 that there is a predetermined degree or more of possibility that the job execution user U2 may approach the MFP 10. Thereafter, the preview images 251 and 252 continue to be displayed on the preview screen 200 without being hidden (see FIG. 5) even after completion of the specific type of job (e.g., basic print job).

If the job execution user U2 is approaching the MFP 10 before completion of the basic print job, the login user U1 may press the non-display button 352. When the non-display button 352 is pressed by the login user U1j, the process skips step S18 and proceeds from step S17 to step S19. Then, the preview images 250 (251, 252) are immediately hidden on the preview screen 200 (step S19) even before completion of the basic print job received from the external device 50 (see FIG. 7).

If the basic print job is completed without the user U1 pressing either of the continued display button 351 and the non-display button 352, the process proceeds from step S18 to step S19, and the preview images 250 are automatically hidden (first display control is performed).

In this way, in the third embodiment, the second display control in which the non-display button 352 for hiding the preview images 250 is displayed is performed prior to the first display control. This enables the login user U1 to press the non-display button 352 when other users (e.g., job execution user U2) are approaching the MFP 10 before execution of the first display control, thus avoiding the possibility that the job execution user U2 may peek at the documents displayed as a preview.

4. Fourth Embodiment

A fourth embodiment is a variation of the first embodiment. The following description mainly focuses on differences from the first embodiment.

In the fourth embodiment, consideration is given on whether the job execution user U2 of a specific type of job received from the external device 50 has the authority to browse the documents displayed on the preview screen 200.

Figure 15:
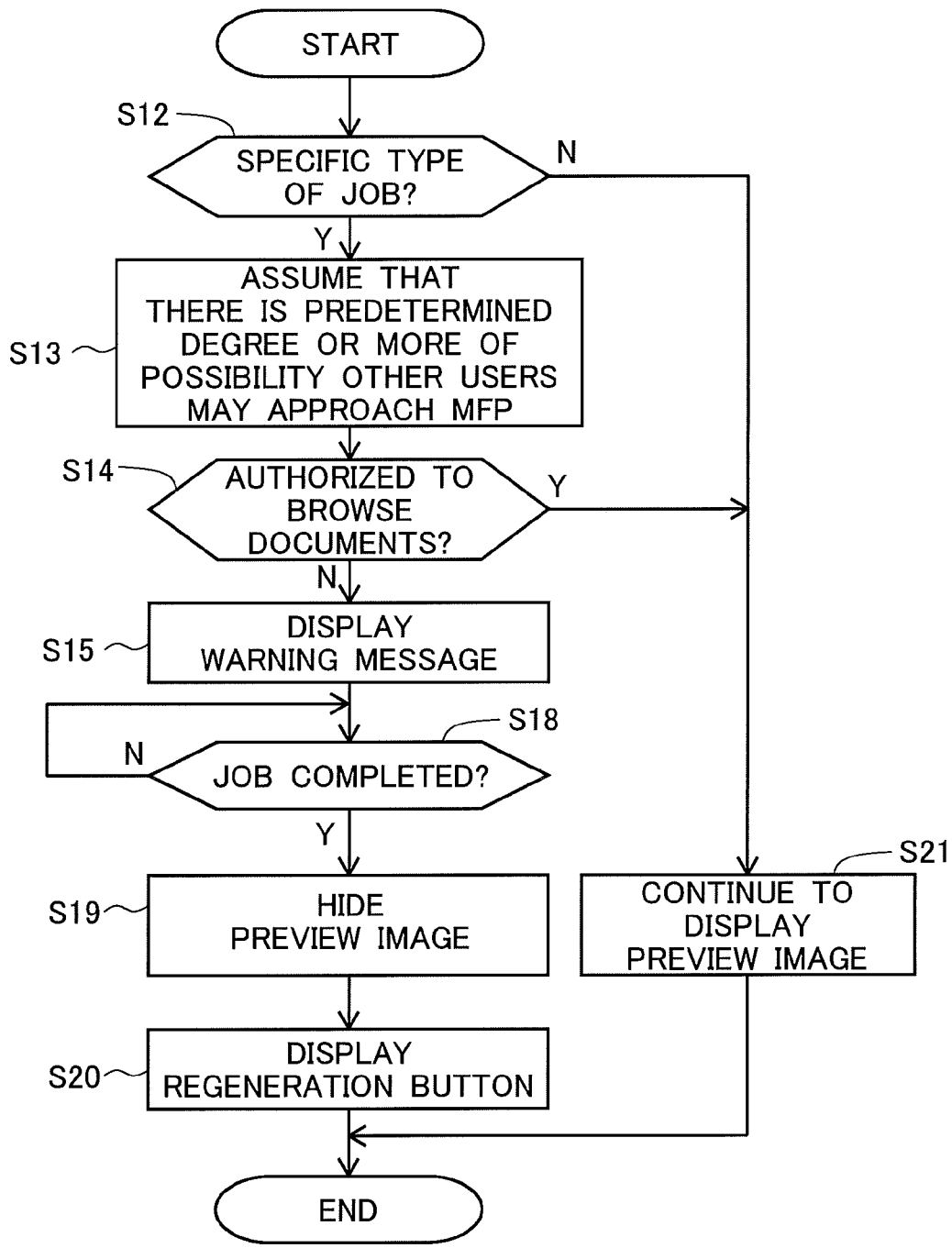
FIG. 15 is a flowchart of operations performed by the MFP according to a fourth embodiment.

FIG. 15 is a flowchart of operations performed by the MFP 10 according to the fourth embodiment. As illustrated in FIG. 15, in the fourth embodiment, processing of step S14 is performed between steps S13 and S15 of the above-described first embodiment (see FIG. 4). The processing in FIG. 15 other than step S14 is performed in the same manner as in the above-described first embodiment.

More specifically, when it is determined in step S12 that a specific type of job (e.g., basic print job) has been received and it is assumed in step S13 that there is a predetermined degree or more of possibility that the job execution user U2 may approach the MFP 10, the process proceeds to step S14.

In step S14, the MFP 10 (determination unit 14) determines whether the job execution user U2 has the authority to browse the documents D1 and D2 (see FIG. 5) displayed on the preview screen 200.

More specifically, an administrator (or document creator) previously registers users who have the authority to browse the documents stored in the MFP 10. Then, a job execution user (here, user U2) is identified on the basis of data such as a user ID included in the job information about the basic print job received from the external device 50, and it is determined in step S14 whether the job execution user U2 has the authority to browse the documents (here, documents D1 and D2) displayed as a preview.

For example, if the job execution user U2 has the authority to browse both of the documents D1 and D2 displayed as a preview, the process proceeds from step S14 to step S21, and the preview images 250 (251, 252) continue to be displayed on the preview screen 200. In other words, when the job execution user U2 has the authority to browse the documents D1 and D2 displayed as a preview, continued display of the preview images 251 and 252 of the documents D1 and D2 is permitted.

On the other hand, if the job execution user U2 does not have the authority to browse the documents D1 and D2 displayed as a preview, the process proceeds from step S14 to step S15 onward, and the preview images 250 of documents over which the job execution user U2 does not have the authority are automatically hidden in step S19.

For example, if the job execution user U2 does not have the authority to browse both of the documents D1 and D2, both of the preview images 251 and 252 of the documents D1 and D2 are automatically hidden in step S19 (see FIG. 7).

Figure 16:
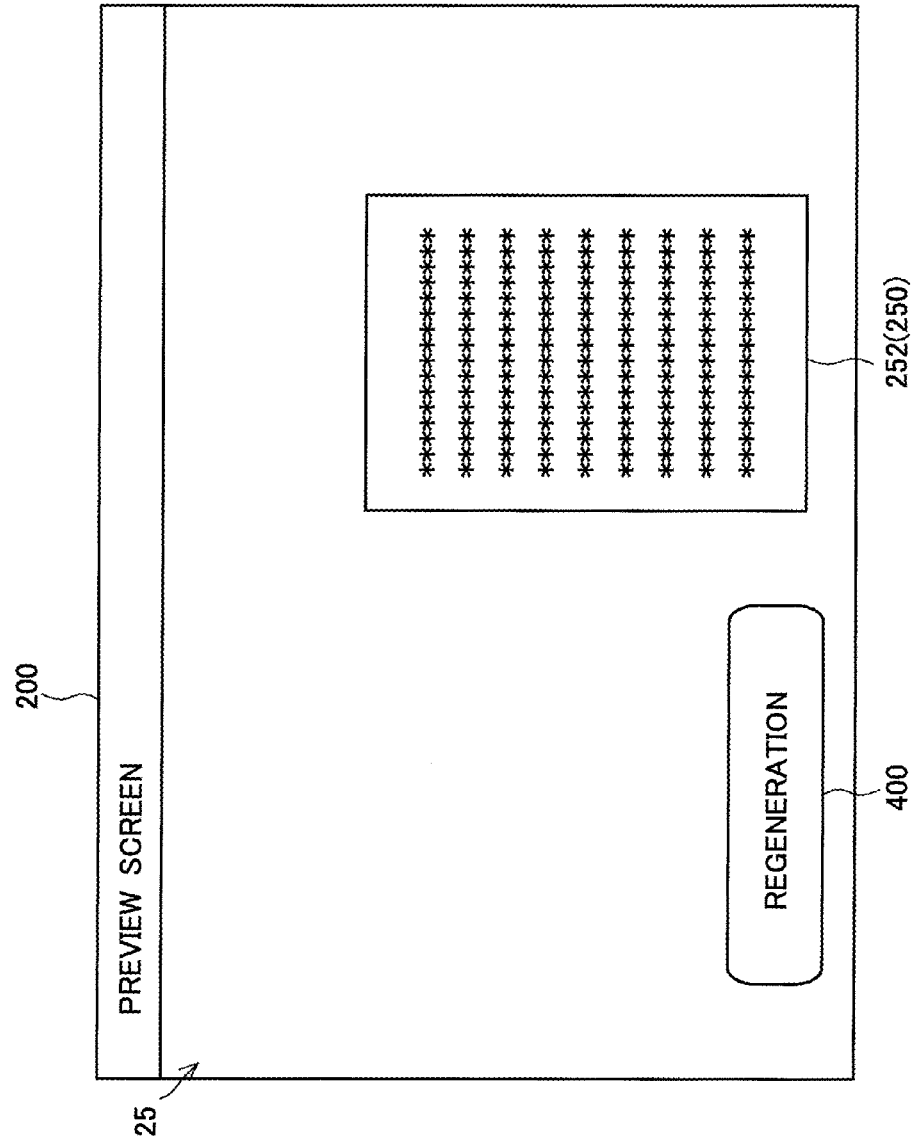
FIG. 16 illustrates a preview screen (after the documents a hidden) according to the fourth embodiment.

If the job execution user U2 does not have the authority to browse one (e.g., document D1) of the documents D1 and D2 but has the authority to browse the other document (e.g., document D2), the preview image 251 of the document D1, out of the documents D1 and D2, is automatically hidden in step S19 (see FIG. 16). In other words, the preview image 252 of the document D2 over which the job execution user U2 has the authority, out of the documents D1 and D2, continues to be displayed on the preview screen 200.

In this way, in the fourth embodiment, the first display control in which the preview images 250 of the documents are automatically hidden is performed on condition that the job execution user U2 does not have the authority to browse the documents displayed as a preview. In other words, when the job execution user has the authority to browse the documents, the preview images 250 of the documents are not hidden. Accordingly, it is possible to suppress a reduction in the operating efficiency of the login user U1 due to such display control that the preview images 250 of the documents are hidden irrespective of the job execution user having the authority to browse the documents.

First Variation of Fourth Embodiment

While the above-described fourth embodiment illustrates a mode in users who have the authority to browse documents are registered in advance, and whether the job execution user has the authority to browse documents displayed as a preview is determined on the basis of this registration, the present invention is not limited to this example. For example, whether the job execution user has the authority to browse the documents displayed as a preview may be determined depending on whether data of the specific type of job received from the external device 50 includes a specific keyword that is designated in advance as a browsing permission word that authorizes users to browse the documents displayed as a preview.

More specifically, the administrator (or document creator) designates in advance a specific keyword for documents stored in the MFP 10 as a browsing permission word that authorizes users to browse the documents. For example, a common code (e.g., development code) that is shared among only people interested in documents is designated in advance as the browsing permission word for the documents.

Then, in step S14, it is determined (searched for) whether data of the specific type of job (e.g., print target data of the basic print job) received from the external device 50 includes a development code designated in advance as the browsing permission word for the documents D1 and D2 displayed as a preview on the preview screen 200.

For example, if it is determined that the print target data of the basic print job received from the external device 50 includes the development code designated in advance for the documents displayed as a preview, it is determined in step S14 that the job execution user of the basic print job has the authority to browse the documents. To be more specific, when a job whose data includes a common code that is used among only people interested in the documents has been received, it is assumed that the job execution user of the job is a person interested in the documents (e.g., a person who belongs to the same department as the user who is browsing the documents), and it is determined that the job execution user has the authority to browse the documents. Then, the process proceeds to step S21, and the preview images 250 of the documents continue to be displayed on the preview screen 200.

On the other hand, if it is determined that the print target data of the basic print job received from the external device 50 does not include the development code designated in advance for the documents displayed as a preview, it is determined in step S14 that the job execution user U2 does not have the authority to browse the documents. To be more specific, it is assumed that the job execution user U2 of the basic print job is not a person interested in the documents, and it is determined in step S14 that the job execution user does not have the authority to browse the documents. Then, the process proceeds to step S15 onward, and the preview image(s) 250 of documents over which the job execution user U2 does not have the authority are hidden on the preview screen 200 in step S19.

For example, if it is determined that the print target data of the basic print job does not include both development codes designated for the documents D1 and D2, it is determined in step S14 that the job execution user U2 does not have the authority to browse both of the documents D1 and D2. Then, both of the preview images 251 and 252 of the documents D1 and D2 are hidden on the preview screen 200 in step S19 (see FIG. 7).

If the print target data of the basic print job does not include the development code designated for one of the documents (e.g., document D1), out of the documents D1 and D2, it is determined in step S14 that the job execution user U2 does not have the authority to browse the document D1. In other words, it is determined in step S14 that the job execution user U2 has the authority to browse the other document (here, document D2), excluding the above document, out of the documents D1 and D2. Then, in step S19, only the preview image 251 of the document D1 over which the job execution user U2 does not have the authority, out of the documents D1 and D2, is hidden on the preview screen 200, and the preview image 252 of the document D2 over which the job execution user U2 has the authority continues to be displayed on the preview screen 200 (see FIG. 16).

In this way, the preview images 250 are automatically hidden on the preview screen 200 on condition that data of a specific type of job received from the external device 50 does not include a specific keyword (here, development code) designated in advance as a browsing permission code.

When a pull scan job has been received as a specific type of job, the presence or absence of a specific keyword may be determined by analyzing data (scan image data) of the pull scan job, while performing the processing of scanning the original document in parallel.

Second Variation of Fourth Embodiment

While the above fourth embodiment (and the first variation of the fourth embodiment) is described as variations of the first embodiment, the following operations are conceivable if the idea of the fourth embodiment (and the first variation of the fourth embodiment) is applied to the second embodiment.

Figure 17:
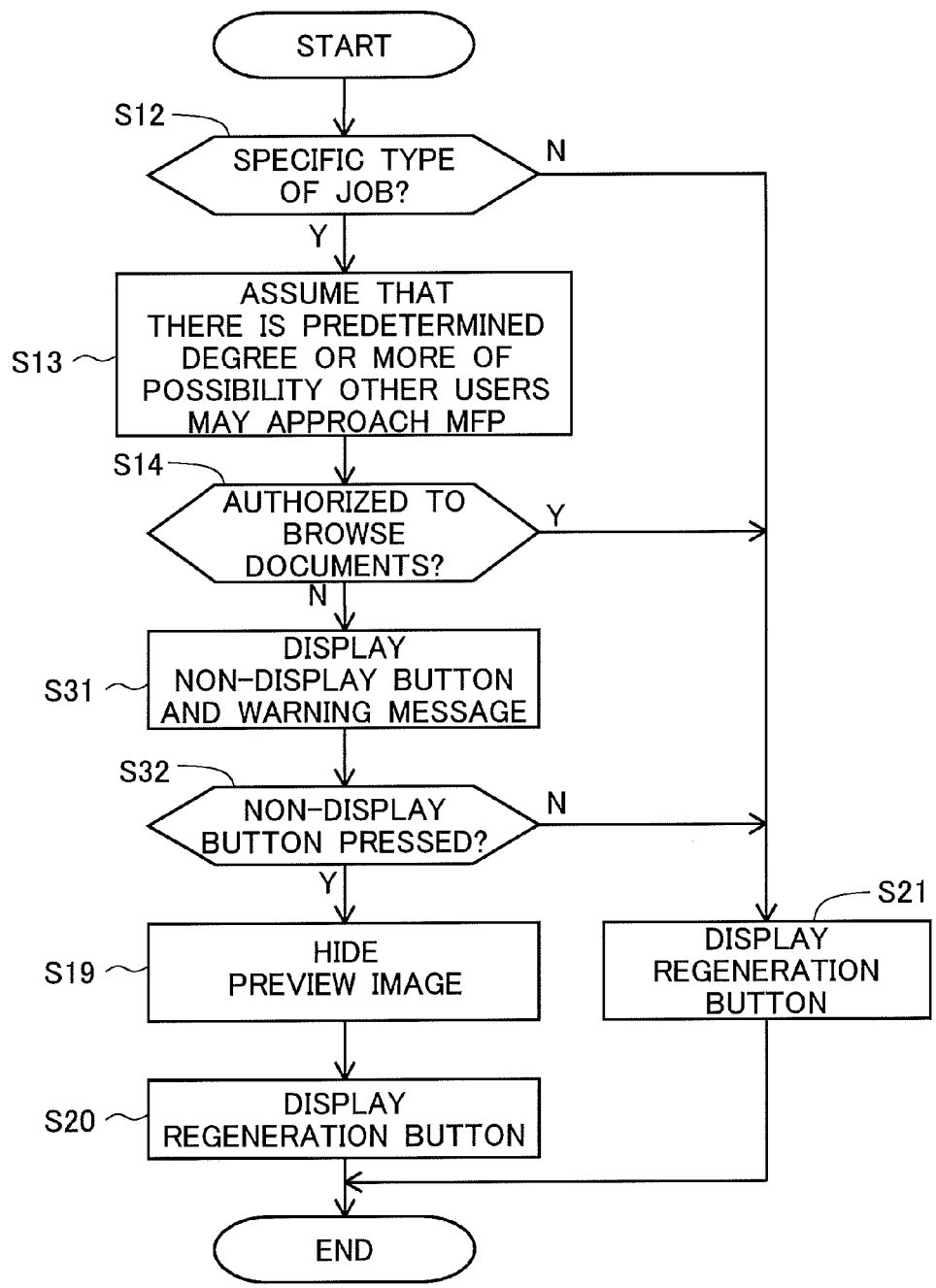
FIG. 17 is a flowchart of operations performed by the MFP according to a second variation of the fourth embodiment.

FIG. 17 is a flowchart of operations performed by the MFP 10 according to a second variation of the fourth embodiment. In the second variation of the fourth embodiment, the processing of step S14 is performed between steps S13 and S31 of the above-described second embodiment (see FIG. 10). The processing of step S14 is performed in the same manner as in the above-described fourth embodiment (and the first variation of the fourth embodiment), and the processing other than step S14 is performed in the same manner as in the above-described second embodiment.

For example, if it is determined in step S14 that the job execution user U2 does not have the authority to browse both of the documents D1 and D2 displayed as a preview, the process proceeds to step S31 (second display control), and the non-display button 360 for hiding both of the preview images 251 and 252 of the documents D1 and D2 is displayed on the preview screen 200 (see FIG. 11). Then, when the non-display button 360 is pressed by the login user U1, both of the preview images 251 and 252 are hidden on the preview screen 200 (see FIG. 7).

If it is determined in step S14 that the job execution user U2 does not have the authority to browse one (e.g., document D1) of the documents, out of the documents D1 and D2, a non-display button 361 for (individually) hiding the preview image 251 of the document D1 is displayed on the preview screen 200 (see FIG. 18) in step S31 (second display control). Then, when the non-display button 361 is pressed by the login user U1, (only) the preview image 251 out of the two preview images 251 and 252 is hidden on the preview screen 200 (see FIG. 16).

5. Variations

While the above has been a description of embodiments of the present invention, the present invention is not limited to the examples described above.

For example, while the above-described embodiments and variations illustrate a mode in which the entire preview images 250 (the entire areas of the page images of the documents) are target areas that are to be hidden, the present invention is not limited to this example, and part of the preview images 250 (partial areas of the page images of the documents) may be target areas that are to be hidden.

More specifically, the administrator (or document creator) may designate in advance areas (to-be-concealed areas 270) that are to be concealed in the documents stored in the MFP 10. Here, an area (partial area) in the lower part of the page image of the document D1 is designated in advance as a to-be-concealed area 270.

In the case of the first embodiment, for example, (only) the to-be-concealed area 270 designated in advance as the area to be concealed in the preview image 251 of the document D1 is automatically hidden in the first display control (see FIG. 19).

In the case of the second embodiment, for example, a button 362 (see FIG. 20) for hiding the to-be-concealed area 270 of the preview image 251 is displayed as a non-display button on the preview screen 200 in the second display control. When the non-display button 362 is pressed by the login user, (only) the to-be-concealed area 270 of the preview image 251 is hidden (see FIG. 19).

In this way, part of the preview images 250 (partial areas of the page images of the documents) may be target areas that are to be hidden.

The above-described first embodiment illustrates a mode in which, when it is determined that a specific type of job has been received, the first display control is performed in which the preview images 250 are automatically hidden. The above-described second embodiment illustrates a mode in which, when it is determined that a specific type of job has been received, the second display control is performed in which the non-display button 360 for hiding the preview images 250 in accordance with a user operation is displayed.

The present invention is, however, not limited to these examples. When it is determined that a specific type of job has been received, the first display control and the second display control may be switched depending on the type of the received job.

For example, the first display control may be employed if it is determined in step S12 that a first type of job (e.g., basic print job or pull scan job) has been received. To be more specific, when the first type of job is completed, the preview images 250 may be automatically hidden on the preview screen 200 as in the first embodiment.

Also, the second display control may be employed if it is determined in step S12 that a second type of job (e.g., confidential print job or facsimile receiving job) has been received. To be more specific, the non-display button 360 (see FIG. 11) for hiding the preview images 250 may be displayed on the preview screen 200 as in the second embodiment.

In this way, the first display control and the second display control may be switched depending on the type of the received job. This increases flexibility in display control performed to suppress the occurrence of other users peeking at documents.

Alternatively, the first display control may be always employed without variations, irrespective of whether the job received from the external device 50 is the first type job or the second type of job.

It is, however, preferable to employ the second display control for the second type of job when consideration is given on the features of the second type of job (here, confidential print job or facsimile reception job).

More specifically, when the second type of job has been received, the timing of approach of other users different from the login user U1 to the MFP 10 may vary relatively greatly.

For example, the job execution user of a confidential print job received from the external device 50 may relatively early approach the MFP 10 and print out print target data, or this job execution user may not relatively early approach the MFP 10 and may intend to print out the print target data several hours later. Also, a user who receives a printout of a facsimile receiving job may relatively early approach the MFP 10 or may not relatively early approach the MFP 10.

Accordingly, the second display control in which the preview images 250 are hidden in accordance with a user operation is preferably employed when the second type of job with such features has been received, instead of employing the first display control in which the preview images 250 of the documents are automatically hidden at specific timing. That is, the second display control in which the timing of hiding the preview images 250 is left for the login user U1 is preferably employed in the case of receiving a job in which the timing of approach of other users to the MFP 10 varies relatively greatly.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising a processor configured to:
    display a preview image of a document on a preview screen while a first user is logged in to the image processing apparatus;
    receive a job from an external device;
    determine whether the job received from the external device is a specific type of job; and
    control display on the preview screen,
    wherein the processor is configured to, when it is determined that the specific type of job has been received during display of the preview screen, assume that there is a predetermined degree or more of possibility that a second user different from the first user will approach the image processing apparatus, and perform at least one of first display control and second display control, the first display control being control in which the preview image is automatically hidden on the preview screen, and the second display control being control in which a non-display button for hiding the preview image in accordance with a user operation is displayed on the preview screen.

2. The image processing apparatus according to claim 1, wherein the second user is a job execution user who has assigned the specific type of job via the external device, and
    the processor is configured to perform the first display control when it is determined that the specific type of job has been received during display of the preview screen.

3. The image processing apparatus according to claim 2, wherein the processor is configured to perform the first display control when the specific type of job is completed.

4. The image processing apparatus according to claim 2, wherein the processor is further configured to:
    measure a receiving duration before receipt of the specific type of job, the receiving duration being a duration of time from when a job assigned by the job execution user via the external device is received to when the job execution user receives a receiving target object that is to be received at the image processing apparatus after completion of the job; and
    store in advance an average receiving duration that is obtained by averaging receiving durations measured for a plurality of jobs assigned by the job execution user,
    wherein the processor is configured to perform the first display control when an expected approach duration calculated on the basis of the average receiving duration has elapsed after receipt of the specific type of job assigned by the job execution user via the external device, the expected approach duration being a duration of time during which the job execution user is expected to approach the image processing apparatus.

5. The image processing apparatus according to claim 2, wherein the processor is configured to perform the first display control when a number of unprocessed pages in the specific type of job started by the image processing apparatus becomes smaller than a predetermined number of pages.

6. The image processing apparatus according to claim 2, wherein the processor is configured to perform the first display control when an amount of unprocessed data in the specific type of job started by the image processing apparatus becomes smaller than a predetermined amount.

7. The image processing apparatus according to claim 2, wherein the processor is configured to perform the first display control when a predetermined ratio of the specific type of job started by the image processing apparatus is completed.

8. The image processing apparatus according to claim 2, wherein the processor is configured to perform the second display control prior to the first display control when it is determined that the specific type of job has been received during display of the preview screen.

9. The image processing apparatus according to claim 2, wherein the processor is configured to: display a continued display button for continuing to display the preview image without hiding the preview image, on the preview screen; and
when the continued display button is pressed by the first user, continue to display the preview image on the preview screen even if it is assumed that there is a predetermined degree or more of possibility that the second user will approach the image processing apparatus.

10. The image processing apparatus according to claim 2, wherein the processor is configured to, when the preview image is hidden on the preview screen, display a regeneration button for regenerating the preview image that has been hidden, on the preview screen.

11. The image processing apparatus according to claim 2, wherein the processor is configured to, when it is determined that the specific type of job has been received during display of the preview screen, display a warning message that warns of approach of the job execution user to the image processing apparatus, on the preview screen prior to the first display control.

12. The image processing apparatus according to claim 2, wherein the processor is configured to, in the first display control, automatically hide a to-be-concealed area that is designated in advance as an area to be concealed in the preview image of the document.

13. The image processing apparatus according to claim 2, wherein the processor is configured to perform the first display control on condition that the job execution user does not have authority to browse the document.

14. The image processing apparatus according to claim 2, wherein the processor is configured to perform the first display control on condition that data of the specific type of job does not include a specific keyword that is designated in advance as a browsing permission word that authorizes browsing of the document.

15. The image processing apparatus according to claim 1, wherein the processor is configured to perform the second display control when it is determined that the specific type of job has been received during display of the preview screen.

16. The image processing apparatus according to claim 15, wherein the processor is configured to hide the preview image on the preview screen when the non-display button is pressed by the first user.

17. The image processing apparatus according to claim 16, wherein the processor is configured to, when the preview image is hidden on the preview screen, display a regeneration button for regenerating the preview image that has been hidden, on the preview screen.

18. The image processing apparatus according to claim 15, wherein the processor is configured to, in the second display control, display a progress of the specific type of job.

19. The image processing apparatus according to claim 15, wherein the processor is configured to, in the second display control, display a warning message that warns of approach of another user to the image processing apparatus, on the preview screen.

20. The image processing apparatus according to claim 15, wherein the non-display button is a button for hiding a to-be-concealed area that is designated in advance as an area to be concealed in the preview image of the document.

21. The image processing apparatus according to claim 15, wherein the second user is a job execution user who has assigned the specific type of job via the external device, and
the processor is configured to perform the second display control on condition that the job execution user does not have authority to browse the document.

22. The image processing apparatus according to claim 15, wherein the processor is configured to perform the second display control on condition that data of the specific type of job does not include a specific keyword that is designated in advance as a browsing permission word that authorizes browsing of the document.

23. The image processing apparatus according to claim 1, wherein the specific type of job includes a basic print job that is a print job that is started in response to receipt of the print job from the external device.

24. The image processing apparatus according to claim 1, wherein the specific type of job includes a pull scan job that is a scan job that is started in response to receipt of the scan job from the external device.

25. The image processing apparatus according to claim 15, wherein the specific type of job includes a confidential print job that is a print job in which print target data received from the external device is temporarily stored in the image processing apparatus and starts to be printed out in response to a user operation performed at the image processing apparatus.

26. The image processing apparatus according to claim 15, wherein the specific type of job includes a facsimile receiving job received from the external device.

27. The image processing apparatus according to claim 1, wherein the specific type of job includes a first type of job and a second type of job, the processor is configured to switch between the first display control and the second display control, depending on a type of a job received from the external device,
the first display control is performed when it is determined that the first type of job has been received from the external device, and
the second display control is performed when it is determined that the second type of job has been received.

28. The image processing apparatus according to claim 27, wherein the first type of job includes at least one of a basic print job and a pull scan job, the basic print job being a print job that is started in response to receipt of the print job from the external device, and the pull scan job being a scan job that is started in response to receipt of the scan job from the external device, and the second type of job includes at least one of a confidential print job and a facsimile receiving job, the confidential print job being a print job in which print target data received from the external device is temporarily stored in the image processing apparatus and starts to be printed out in response to a user operation performed at the image processing apparatus, and the facsimile receiving job being a job received from the external device.

29. A non-transitory computer-readable recording medium that stores a program for causing a computer built into an image processing apparatus to execute:
  a) displaying a preview image of a document on a preview screen while a first user is logged in to the image processing apparatus;
  b) receiving a job from an external device;
  c) determining whether the job received from the external device is a specific type of job; and
  d) controlling display on the preview screen,
    wherein, in the operation d), when it is determined that the specific type of job has been received during display of the preview screen, it is assumed that there is a predetermined degree or more of possibility that a second user different from the first user will approach the image processing apparatus, and at least one of first display control and second display control is performed, the first display control being control in which the preview image is automatically hidden on the preview image, and the second display control being control in which a non-display button for hiding the preview image in accordance with a user operation is displayed on the preview screen.

* * * * *